United States Patent
Hines, III et al.

(10) Patent No.: US 12,432,049 B2
(45) Date of Patent: Sep. 30, 2025

(54) SYSTEMS, APPARATUS, AND METHODS FOR GENERATION, PACKAGING, AND SECURE DISTRIBUTION OF SYMMETRIC QUANTUM CYPHER KEYS

(71) Applicant: ZEROPROOF, LLC, Fort Lauderdale, FL (US)

(72) Inventors: Robert C Hines, III, Irvine, CA (US); Scott Lazarus, Fort Lauderdale, FL (US)

(73) Assignees: ZEROPROOF, LLC, Fort Lauderdale, FL (US); Scott Lazarus, Fort Lauderdale, FL (US)

( * ) Notice: Subject to any disclaimer, the term of this patent is extended or adjusted under 35 U.S.C. 154(b) by 325 days.

(21) Appl. No.: 17/871,959

(22) Filed: Jul. 24, 2022

(65) Prior Publication Data
US 2023/0027422 A1    Jan. 26, 2023

Related U.S. Application Data

(60) Provisional application No. 63/225,485, filed on Jul. 24, 2021.

(51) Int. Cl.
*H04L 9/08* (2006.01)
*H04L 9/06* (2006.01)

(52) U.S. Cl.
CPC .......... *H04L 9/0825* (2013.01); *H04L 9/0819* (2013.01); *H04L 9/0852* (2013.01); *H04L 9/0869* (2013.01); *H04L 9/0662* (2013.01)

(58) Field of Classification Search
CPC ....... H04L 9/08; H04L 9/0816; H04L 9/0819; H04L 9/0825; H04L 9/0852;
(Continued)

(56) References Cited

U.S. PATENT DOCUMENTS

| 3,657,476 A | 4/1972 | Aiken |
| 4,405,829 A | 9/1983 | Rivest et al. |

(Continued)

OTHER PUBLICATIONS

ID Quantique; "Quantum Key Distribution (QKD)"; www.idquantique.com; downloaded May 27, 2021; 4 pages.
(Continued)

*Primary Examiner* — D'Arcy Winston Straub
(74) *Attorney, Agent, or Firm* — Alford Law Group, Inc.; William E. Alford

(57) ABSTRACT

Methods for quantum key distribution are disclosed including forming a quantum production key package with a production file name; forming a first quantum sacrificial key package with a first sacrificial file name associated with a portion of the first production file name; sending the quantum sacrificial key package to a sacrificial key server; and sending the quantum production key package to computer devices to set up a quantum key encryption tunnel between the computer devices. The quantum production key packages are received by computer devices that send the production file name to the sacrificial key server to receive the sacrificial return key. The sacrificial return key is used to decrypt the quantum production key package with the quantum production keys. A first quantum production key is retrieved to encrypt and decrypt data at each computer device.

11 Claims, 22 Drawing Sheets

(58) Field of Classification Search
CPC ....... H04L 9/0861; H04L 9/0869; H04L 9/06; H04L 9/065; H04L 9/0656; H04L 9/0662
See application file for complete search history.

(56) References Cited

U.S. PATENT DOCUMENTS

| | | | |
|---|---|---|---|
| 8,073,336 | B2 | 12/2011 | Trifonov |
| 9,729,577 | B2 | 8/2017 | White et al. |
| 9,967,289 | B2 | 5/2018 | White et al. |
| 10,257,230 | B2 | 4/2019 | White et al. |
| 10,560,440 | B2 | 2/2020 | White et al. |
| 10,567,355 | B2 | 2/2020 | White et al. |
| 10,630,686 | B2 | 4/2020 | White et al. |
| 10,713,077 | B2 | 7/2020 | Pepus et al. |
| 10,742,689 | B2 | 8/2020 | White et al. |
| 10,860,086 | B2 | 12/2020 | White et al. |
| 10,880,281 | B2 | 12/2020 | Edwards et al. |
| 10,909,254 | B2 | 2/2021 | Czajkowski |
| 10,931,653 | B2 | 2/2021 | White et al. |
| 10,965,459 | B2 | 3/2021 | White et al. |
| 2011/0243331 | A1* | 10/2011 | Yasuda ............... H04L 9/0836 380/46 |
| 2013/0083926 | A1* | 4/2013 | Hughes ............... H04L 9/3247 380/278 |
| 2013/0163759 | A1 | 6/2013 | Harrison et al. |
| 2016/0013936 | A1 | 1/2016 | Hughes et al. |
| 2017/0264434 | A1 | 9/2017 | Takahashi et al. |
| 2017/0324550 | A1* | 11/2017 | Yuan ..................... H04L 9/40 |
| 2019/0394031 | A1 | 12/2019 | Deng et al. |
| 2024/0178994 | A1 | 5/2024 | Bedington et al. |

OTHER PUBLICATIONS

National Security Agency; "Quantum Key Distribution (QKD) and Quantum Cryptography (QC)"; www.nsa.gov; downloaded May 27, 2021; 4 pages.
Forbes Technology Council; "To QKD or Not to QKD: What Quantum Key Distribution Means for Business"; dated Dec. 18, 2020; www.forbes.com; downloaded May 27, 2021; 5 pages.
Popeskic, Valter; "QKD—How Quantum Cryptography Key Distribution Works"; www.howdoesinternetwork.com, downloaded May 28, 2021; 12 pages.
Popeskic, Valter; "Introduction to Quantum Cryptography"; www.howdoesinternetwork.com, downloaded May 28, 2021; 8 pages.
Kothari, Abhishek; "Qubit by Qubit, An Introduction to Quantum Key Distribution (QKD)"; Nov. 12, 2018; www.abhishekkothari.medium.com, downloaded May 29, 2021; 10 pages.
Wikipedia; "Qubit"; en.wikipedia.org, downloaded May 27, 2021; 9 pages.
"The Definitive Guide to Encryption Key Management Fundamentals"; info.townsendsecurity.com, downloaded May 27, 2021; 33 pages.
Virtru; "The Simple Guide to Encryption Key Management"; www.virtru.com, downloaded May 22, 2021 ;42 pages.
EYL; Brochure—"Quantum Entropy: The Ultimate Randomness Nature Has to Offer"; downloaded, May 28, 2021; 12 pages.
ID Quantique: Brochure—"Quantis Appliance 2.0"; 2021, 4 pages.
ID Quantique: Brochure—"Quantis QRNG Chip"; 2020; 4 pages.
ID Quantique: White Paper—"Quantum versus Classical Random Number Generators"; May 2020; 17 pages.

Physics World; "Fast quantum random No. generator could advance cryptography on the cheap"; Dec. 9, 2020; www.physicsworld.com, downloaded May 28, 2021; 4 pages.
Hibbard, Eric; Hitachi Data Systems; "Intro to Encryption and Key Management: Why, What and Where?"; 2016; Storage Networking Industry Association; 28 pages.
Tutorialspoint; "Advanced Encryption Standard"; www.tutorialspoint.com, downloaded Mar. 8, 2021; 5 pages.
Tutorialspoint; "Public Key Infrastructure"; www.tutorialspoint.com, downloaded Mar. 8, 2021; 10 pages.
Wadday, Ahmed G.; "Study of WiMAX Based Communication Channel Effects on the Ciphered Image Using MAES Algorithm"; International Journal of Applied Engineering Research • Apr. 2018; pp. 6009-6018.
Privacy Guy; "What is Encryption & How Does It Work?"; www.medium.com, downloaded May 26, 2021; 6 pages.
Rukhin, Andrew et al.; "A Statistical Test Suite for Random and Pseudorandom Number Generators for Cryptographic Applications"; National Institute of Standards and Technology, Apr. 2010; 131 pages.
Mehuron, William; "Data Encryption Standard (DES)"; National Institute of Standards and Technology; Oct. 25, 1999; 27 pages.
Rice, Patrick and Owens, Israel J. "Comparison Between Continuous Wave and Pulsed Laser EQKD Systems"; Quantum Physics (quant-ph); arXiv:0809.0923 [quant-ph]; Sep. 4, 2008; 5 pages.
ETSI; "Group Specification: Quantum Key Distribution (QKD); Protocol and data format of REST-based key delivery API"; ETSI, 2019; 22 pages.
"Announcing the Advanced Encryption Standard (AES)"; Federal Information Processing Standards Publication 197; National Institute of Standards and Technology; Nov. 26, 2001; 51 pages.
"Quantum versus Classical Random Number Generators", Random Number Generation White Paper, ID Qauntique SA; May 2020; 17 Pages.
"Understanding Quantum Cryptography", Quantum-Safe Security White Paper; ID Qauntique SA; May 2020; 16 Pages.
"A Conventional Authenticated-Encryption Mode" by Bellare, M., Rogaway, P., Wagner, D.; Apr. 13, 2003; 14 pages.
Rodriquez, Karl; "Written Opinion of International Searching Authority"; International App. No. PCT/US2022/038107; Nov. 30, 2022; 7 pages.
Rodriquez, Karl; "International Search Report"; International App. No. PCT/US2022/038107; Nov. 30, 2022; 8 pages.
Tsai et al; "Quantum Key Distribution Networks: Challenges and Future Research Issues in Security"; Applied Sciences; Apr. 2021; 15 pages.
Sasaki et al; "Quantum Key Distribution and Its Applications"; IEEE Computer and Reliability Societies; Sep. 2018; 7 pages.
Amer et al.; "An Introduction to Practical Quantum Key Distribution"; IEEE Age Systems Magazine; Mar. 2021; 26 pages.
Zbinden et al.; "Random Numbers for Quantum Key Distribution"; 10th Symposium on Symbolic and Numeric Algorithms for Scientific Computing, IEEE Computer Society; 2008; 1 page.
Lo et al. ; "Distributed Symmetric Key Establishment: A Scalable, Quantum-Proof Key Distribution System"; arXiv—Cornell University; May 2022; 11 pages.
Kuzminykh et al.; "Comparative Analysis of Cryptographic Key Management Systems"; arXiv-Cornell University; Sep. 2021; 12 pages.
Mangipudi et al.; "Quantum Cryptography and Quantum Key Distribution Protocols: A Survey on the Concepts, Protocols, Current Trends, and Open Challenges"; Science Direct; 2022; 16 pages.

* cited by examiner

FIG. 10B

1021P — SameNameSameNamexxxxxxxxxxxxxxxx
SameNameSameNameyyyyyyyyyyyyyyyy — 1026S

FIG. 10C

1022P — xxxxxxxxxxxxxxxxSameNameSameName
YYYYYYYYSameNameSameName — 1027S

FIG. 10D

1023P — xxxxxxxxSameNameSameNamexxxxxxxx
YYYYYYYYSameNameSameNameyyyyyyyy — 1028S

FIG. 10E

1024P — xxxxxxxxSameNameSameNameFxxxxxxx   1025P
YYYYYYYYSameNameSameNameFyyyyyyy — 1029S   1025S

FIG. 10F

1030P — xxxxxxxxPackageDifferentxxxxxxxx
YYYYYYYYSacrificialPackFyyyyyyy — 1031S

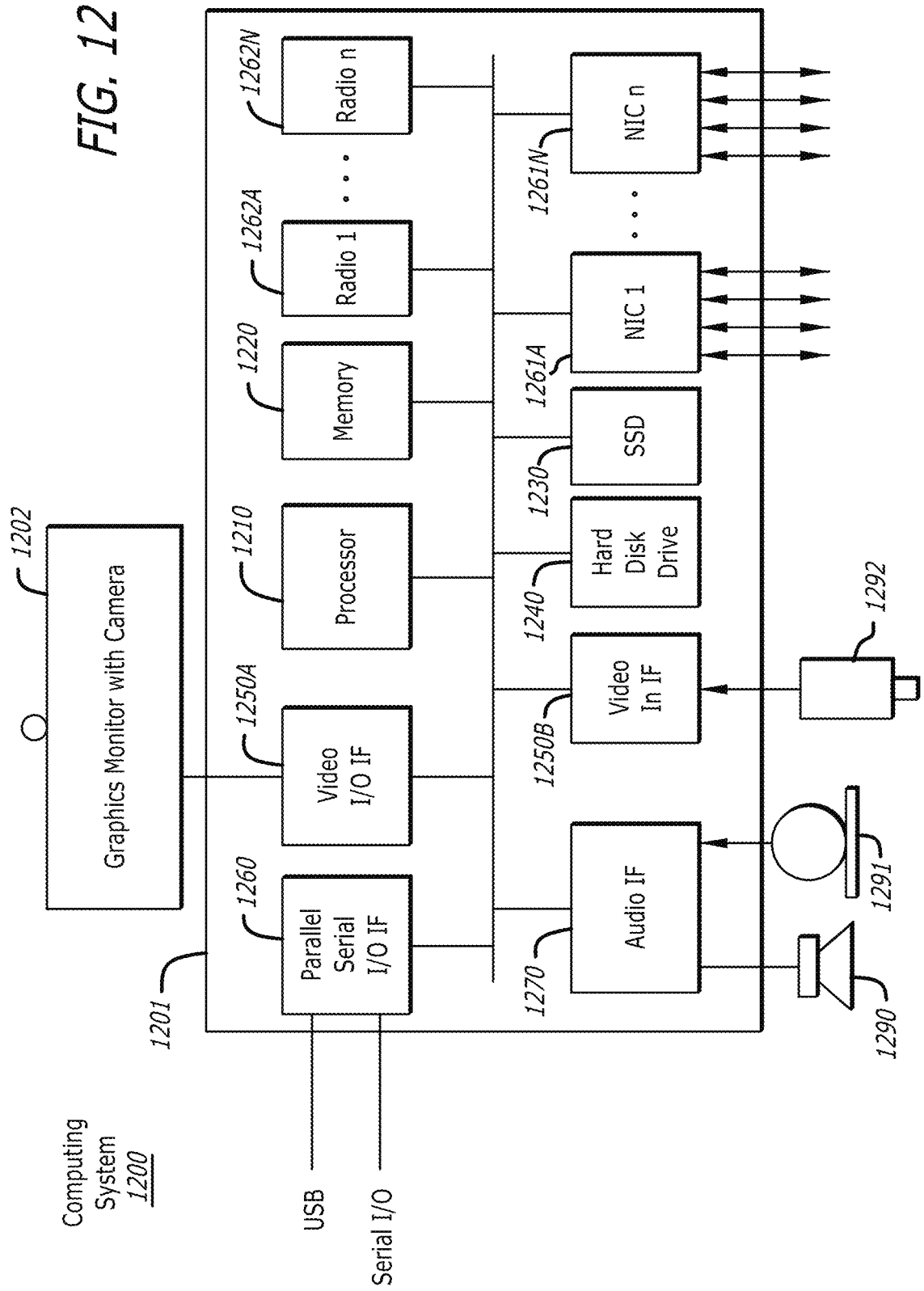

SYSTEMS, APPARATUS, AND METHODS FOR GENERATION, PACKAGING, AND SECURE DISTRIBUTION OF SYMMETRIC QUANTUM CYPHER KEYS

CROSS REFERENCE

This patent application claims the benefit of U.S. Provisional Patent Application No. 63/225,485 entitled "SYSTEMS, APPARATUS, AND METHODS FOR GENERATION, PACKAGING, AND SECURE DISTRIBUTION OF SYMMETRIC QUANTUM CIPHER KEYS" filed on Jul. 24, 2021 by inventors Robert Hines et al., incorporated herein by reference for all intents and purposes.

FIELD

The embodiments relate generally to cipher (encryption and decryption) key generation and distribution for cryptography.

BACKGROUND

Cryptography generally involves encryption of plain information (plaintext) into encrypted information (ciphertext) and the decryption of the encrypted information (ciphertext) back into plain information (plaintext). Encryption basically encodes the plain information into ciphertext using a math algorithm and an encryption key. Decryption basically decodes the ciphertext back into plaintext using a reverse math algorithm and a decryption key. Provided the decryption key or both keys are kept secret with only authorized users having knowledge, only authorized parties should be able to decipher a ciphertext back to plaintext. Encryption does not itself prevent interference. However, encryption can deny the intelligible content of the plaintext from a would-be interceptor.

Generally, there are basically two types of encryption, symmetric encryption and asymmetric encryption. The different types of encryption can use different types of cipher keys. For asymmetric encryption, the encryption keys are different from the decryption keys. For symmetric encryption, the same cypher key is used for both encryption and decryption. Accordingly, symmetric encryption key can simply be referred to as an encryption key and used both encryption of data and decryption of data. A symmetric encryption key typically relies on the encryption key itself being kept secret.

Asymmetric encryption uses a set of two different cipher keys that are paired together for a user. One cipher key is an encryption key that is used to encrypt data and/or text. The other cipher key is a decryption key that is used to decrypt the encrypted data/text into unencrypted data or clear text. The encryption key can be made public, referred to as a public key in pubic key encryption, and used by other users to encrypt data for receipt by a specific user. The decryption key, referred to as the private key, is solely known to and used by the specific user to decrypt the encrypted data. The public key can be broadcast to others and need not be kept secret. With only the public key, encrypted data cannot be decrypted. Each user has both a private key and a public key that is given to others to encrypt data for sending. Accordingly, with asymmetric encryption a total of four keys are normally required. An SSL certificate used over the internet by a web browser is a form of a public encryption key. The private keys are usually generated on each side for each internet session, referred to as a private session key.

The use of four different keys complicates secure communication. However, symmetric encryption key systems requires secrecy of the symmetric encryption key. Improved methods and systems are desirable to make it easier and more secure to use symmetric encryption keys.

BRIEF SUMMARY

The embodiments are summarized by the claims that follow below.

BRIEF DESCRIPTIONS OF THE DRAWINGS

FIGS. 10B-10E illustrate examples of alternate quantum random nomenclature (file names) for production key packages and sacrificial key packages having a matching character portion.

FIG. 10F illustrates an example of a quantum random nomenclature (file names) for a production key package and a sacrificial key package without a matching character portion.

FIG. 12 is a block diagram of a computer system for use as a server computer and client computers (devices) in the cypher computer network of FIG. 1.

DETAILED DESCRIPTION

Figure 1A:
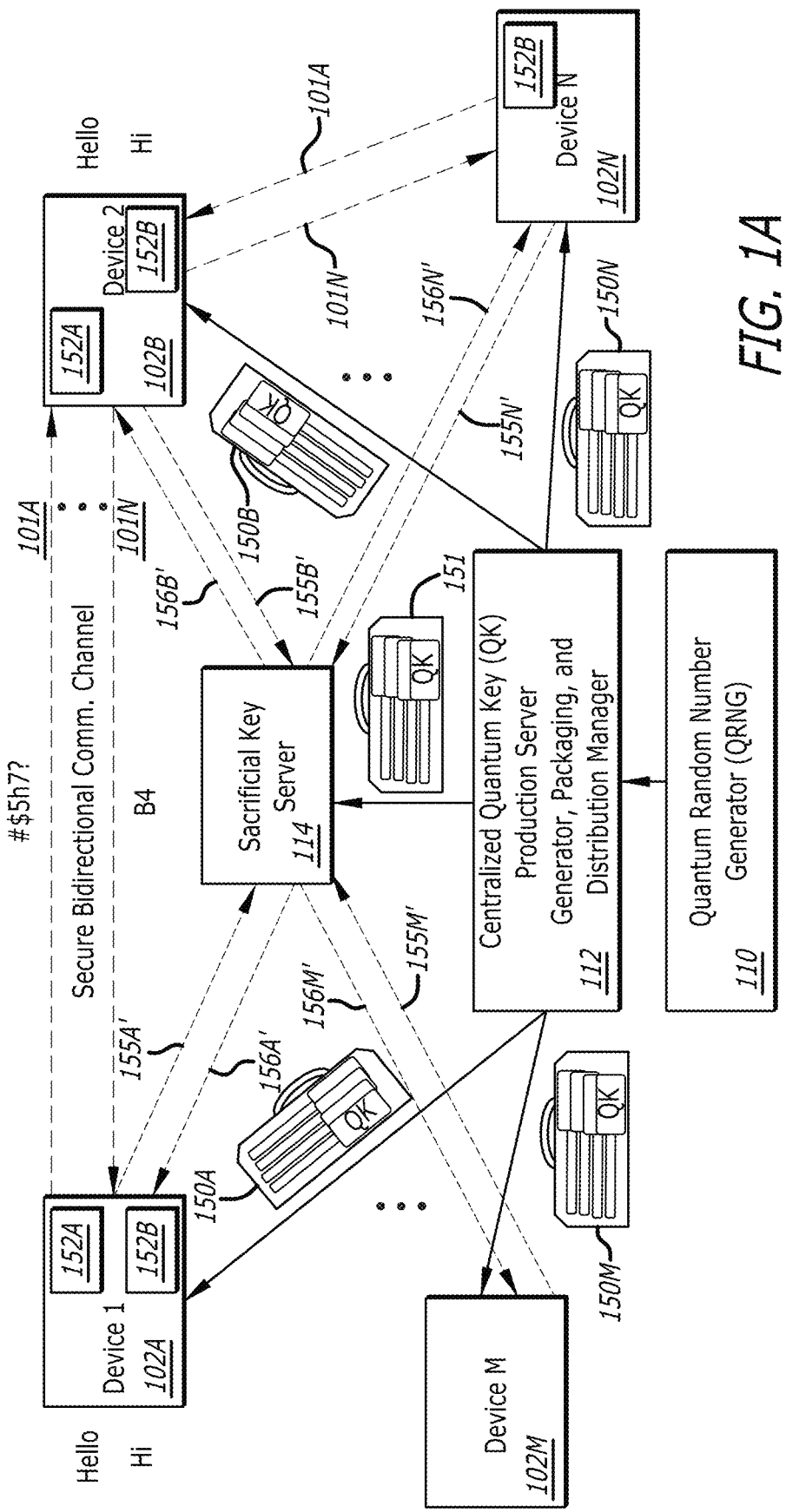
FIG. 1A is a functional block diagram of a cypher computer network with one or more secure communication channels (quantum tunnels) between devices that use packages with a plurality of symmetric production quantum keys.

In the following detailed description of the disclosed embodiments, numerous specific details are set forth in order to provide a thorough understanding. However, it will be obvious to one skilled in the art that the embodiments may be practiced without these specific details. In other instances, well known methods, procedures, components, and circuits have not been described in detail so as not to unnecessarily obscure aspects of the disclosed embodiments.

The disclosed embodiments include systems, apparatus, and methods for generation, packaging, and distribution of quantum keys for encrypting and decrypting data and text to form a secure communication channel.

Introduction

Encryption/decryption keys are often generated by a key generator. The encryption keys are generally generated based on random numbers that are in turn generated by an electronic random number generator. However, electronic random number generators are often not fully random. Depending upon bit-length, encryption keys generated with electronic random number generators can be cracked by super computers when given sufficient time because a pattern usually develops. It is thought that future quantum computers will be able to crack encryption keys generated with electronic random number generators in less time because of their promise for increased computational bandwidth. Recently, quantum mechanics has been used to form a quantum random number generator, based on photons, that is truly random. Accordingly, encryption keys generated with a quantum random number generator, referred to as quantum encryption keys or quantum keys, are extremely difficult for a super computer to crack. It is expected that even a quantum computer based on quantum mechanics would find difficulty in cracking quantum cypher keys generated with a quantum random number generator.

After generation, cypher keys still need to be distributed to those that need them to encrypt and decrypt data. This process is referred to as key distribution. But for a public key for asymmetric encryption, the encryption keys must be securely (secretly) distributed to users. Key distribution usually does not involve data encryption/decryption.

Encryption keys should not be used for ever forever, but periodically changed. New encryption keys should periodically be generated and distributed. Old encryption keys can be discarded or safely archived so that older encrypted information can still be decrypted, after new encryption keys are adopted. The key distribution process should periodically refresh the encryption keys so that it makes it more difficult for cipher text to be intercepted and decrypted.

Users of the encryption process are usually very technically inclined and very experienced with computers and software, leaving less experienced users behind. The experienced users are often very involved in the encryption process and have a thorough understanding of encryption/decryption process. The experienced users often have to actively demand or generate the encryption keys and install them in the encryption system. Accordingly, the encryption system is often not transparent to the user nor easy to use.

It is desirable to make the encryption system transparent to users. It is desirable to improve the distribution process of encryption keys such that it is more safe and secure. It is desirable to improve the distribution process of encryption keys so that periodic updates can be readily made in the event of hacking or intrusion.

In the discussion herein, such as regarding key packages and key package distribution, a symmetric cypher algorithm is predetermined having a predetermined bit length (e.g., AES-64 with 64 bits) in the use and generation of quantum cypher keys based on a quantum random number generator. The quantum cypher keys are symmetric to use for both encryption and decryption of data/text. That is, the servers and the client devices know the symmetric cypher algorithm being used, the method by which keys are generated, and how keys are retrieved from a key package and used. Two types of symmetric cypher keys can be used, a sacrificial key and a production cypher key. There are two types of sacrificial keys, sacrificial send keys and sacrificial return keys, that can be used to protect the production cypher key. Generally, sacrificial send and return keys are used to gain access to a production key. In accordance with one embodiment, a sacrificial send and return key can be used once. A sacrificial key server can be a one-time sacrificial key server. In an alternate embodiment, a sacrificial send and return key can be used over multiple cycles. The symmetric production key is used to encrypt and decrypt data for the secure communication channel. A first symmetric production key in a key package can be repeatedly used for a quantum tunnel until a time when it is appropriate to switch to a second symmetric production key. The switch to the next production key can be time/date based so that each device of a plurality of devices concurrently switch to the next production key, which can be the same production key. Alternatively, the switch to the next production key can be event based, such as a network being hacked by a bad computer device and bad actors. In which case, a switch key signal can be sent to each device of a plurality of devices so that they all concurrently switch to the next production key.

Generally, for devices, a plurality of production keys are stored in a production key package, such that the generation and distribution of keys is periodic. Similarly, a plurality of sacrificial send keys are stored in the production key package. With a plurality of production keys and a plurality of sacrificial send keys, transition from one key to another can be methodical, such as based on time and date, or based on an event or signal.

Generally, for sacrificial key servers, a plurality of sacrificial return keys are stored in a sacrificial key package. With a plurality of sacrificial return keys, transition from one key to another can be methodical, such as based on time and date, or based on an event or signal. The sacrificial key servers can be virtual servers created by one or more physical servers located in data centers around the world. Virtual sacrificial key servers can be started up, based on receipt of a sacrificial send key that is sent to a sacrificial key server address.

Encryption (Cryptographic) Computer Network

Referring now to FIG. 1A, an encryption (cryptographic) computer network system 100A is shown that can generate a plurality of symmetric quantum cypher keys, package them into packages and physically or logically distribute the packaged quantum keys to devices for encrypting and decrypting data/text to form one or more secure communication channels 101A-101N. The computer network system can be a wide area network with the secure communication channel 101 over the internet between devices in different locations. Alternatively, the computer network system can be a local area network with the secure communication channel 101 being in the local network between devices that are collocated in the same company or general location. Using quantum cipher keys and the predetermined cypher algorithm, one or more quantum tunnels can provide security over the communication channels 101A-101N. Each production quantum cypher key can provide one quantum tunnel. Two quantum tunnels 101A-101B provided by two different production quantum cypher keys can be used to provide full duplex bidirectional communication between devices. When there is a need to switch keys, the next two different production quantum cypher keys can be used to provide two quantum tunnels 101C-101D.

The encryption computer network system 100A includes a plurality of client devices 101A-102N, a quantum random number generator (QRNG) 110, a quantum key (QK) production server 112, and a sacrificial key server 114. The quantum key (QK) production server 112 is coupled to the quantum random number generator (QRNG) 110 to receive a quantum random number. With the quantum random number and a predetermined cypher algorithm, the quantum key (QK) production server 112 can generate a plurality of quantum keys to use as production keys, sacrificial send keys, and sacrificial return keys. The quantum key (QK) production server 112 can package a first plurality of related cypher keys into a production key package 150A-150N and can package a second plurality of related cypher keys into a sacrificial key package 151. The sacrificial key package 151 and the production key package 150A-150N are associated with each other. The plurality of quantum cypher keys are pre-shared keys secured in each of the production key packages 150A-150N that can be decrypted and accessed similar to peeling off layers of an onion from the outside.

The plurality of production keys and the plurality of sacrificial send keys can be packaged together into a production key package 150A-150N by cascading/nesting and encrypting them into encrypted key files using sacrificial return keys at different levels. A plurality of sacrificial return keys can be packaged together into a sacrificial key package 151 by cascading/nesting and encrypting them into encrypted key files using sacrificial send keys at different levels. The association between the sacrificial key package 151 and the production key package 150A-150N can be indicated by a relatedness in a portion of each file name. That is, the production key package file name of the production key package 150A-150N and the sacrificial key package file name of the sacrificial key package 151 can be related, such as by using an identical sequence of characters over a portion of the file name, (e.g., first 32 characters of 64 characters).

The quantum key (QK) production server is coupled in communication with the sacrificial key server 114 to deliver the sacrificial key package 151. To deliver the production key package 150A-150N, the quantum key (QK) production server 112 can be coupled in communication with the plurality of client devices 101A-102N. The plurality of client devices 101A-102N can periodically be coupled in communication with the sacrificial key server 114. The plurality of client devices 101A-102N transmit sacrificial send keys 155A'-155N' to the sacrificial key server 114 in order to receive sacrificial return keys 156A'-156N' back from the server 114. The sacrificial return keys 156A'-156N' can be synchronously used by each of the devices 102A, 102B to decrypt encrypted key files from the production key packages 150A,150B and obtain access to a quantum production key 152A.

The quantum production key 152A can be used by the devices 102A, 102B with a cypher algorithm to encrypt data for transmission over the communication channel 101 and to decrypt data received from the communication channel 101. For example, the quantum production key 152A can be used by device 102A with a predetermined cypher algorithm to encrypt the word Hello into #$5h7? for communication from device 102A to device 102B over the communication channel 101. Device 102B receives the encrypted text #$5h7? from the communication channel 101 and can use the symmetric quantum production key 152A with the predetermined cypher algorithm to decrypt #$5h7? back into the clear text of the word Hello. Similarly, as another example, consider the communication of the word Hi from device 102B to device 102A over the communication channel 101. For example, device 102B can encrypt the word Hi using the symmetric quantum production key 152A with the predetermined cypher algorithm into B4. The encrypted word B4 can be transmitted from device 102B to device 102A over the communication channel 101. Device 102A receives the encrypted text B4 from the communication channel 101. The device 102A can then use the symmetric quantum production key 152A with the predetermined cypher algorithm to decrypt B4 back into the clear text of the word Hi. This is a simple example of encryption and decryption (cryptography) to explain the process. The actual character length of encrypted characters in words is substantially longer.

The predetermined cypher algorithm can be any symmetric stream cypher algorithm that uses symmetric keys or any symmetric block cypher algorithm that uses symmetric keys, such as Twofish, Serpent, AES, *Camellia*, Salsa20, ChaCha20, Blowfish, CAST5, Kuznyechik, RC4, DES, DES-X, 3DES, Skipjack, Safer, and IDEA. In one embodiment, the predetermined cypher algorithm is the Advanced Encryption Standard (AES) cypher algorithm, also referred to as Rijndael block cypher, described in Federal Information Processing Standards Publication 197, Nov. 26, 2001, SPECIFICATION FOR THE ADVANCED ENCRYPTION STANDARD (AES) for example. Authentication can be added as part of the predetermined cypher algorithm such as Authenticated Encryption with Associated Data (AEAD) algorithms/methods described in THE SOFTWARE PERFORMANCE OF AUTHENTICATED-ENCRYPTION MODES by Ted Krovetz and Phillip Rogaway for example, that provides both confidentiality and authenticity.

The symmetric quantum production key 152A can be used repeatedly by the devices 102A, 102B to encrypt data and/or text and to decrypt data and/or text for the secure communication of data and/or text over the communication channel 101 until an event occurs or time passes. After an event or time passage, the devices 102A, 102B can communicate a next sacrificial send key to a sacrificial key server to receive a sacrificial return key back from the server that can be used to decrypt the next encrypted key file in the production key package to obtain a next symmetric quantum production key 152B. The prior symmetric quantum production key 152A can be stored if it is desirable to open past encrypted data again. Alternatively, the prior symmetric quantum production key 152A can discarded if the past encrypted data is no longer needed.

If a new device, such as device 102N wants to join the communication channel 101 along with the devices 102A, 102B, the device 102N receives the same production key package 150N. Device 102N then steps through the levels of the production key package 150N one by one with the sacrificial key server 114 to catch up and obtain the current production key 152B being used by the devices 102A, 102B.

With a plurality of production keys in a production key package at each device, it is reasonably easy to move from one encryption key to the next by just opening the next level in the production key package. Periodically changing encryption keys, concurrently at all devices, can increase the security of communications over a communication channel. Quickly changing encryption keys, concurrently at all devices, shortly after an event, can increase the security of communications over a communication channel. A change key signal after an event can be broadcast from a server, such as the quantum key production server 112, to the devices 102A-102N in the encryption computer network 100 to cause the devices in the network to concurrently execute a process to change to the next quantum production key.

The sacrificial key server 114 can be one or more virtual servers, containers, or routines that are executed by a computer server in response to receiving a sacrificial send key at a predetermined network addresses. For example, device 102M can transmit a sacrificial send key 155M' at a network address that causes the sacrificial key server 114 to open a virtual server, container, or subroutine to execute a process of transmitting back a sacrificial return key 156M' to grant access or some other process and/or return communication to inform the device 102M of the status and next process to perform.

Between devices, the secure communicational channels 101A-101N can be a point to point secure communication channel, a one to many secure communication channel, or a many to many secure communication channel. While a point to point secure communication channel is shown in FIG. 1A, different types of computer networks can be used with symmetric quantum cipher keys to provide different types of secure communication channels with one or more servers, one or more switches, and one or more routers. For example, a genesis type of network, a grid network, a linear network, a non-linear network, an array network, a star network and a ring network can utilize a production key server and one or more sacrificial key servers to secure communication channels between a plurality of devices 102A-102N.

Figure 1B:
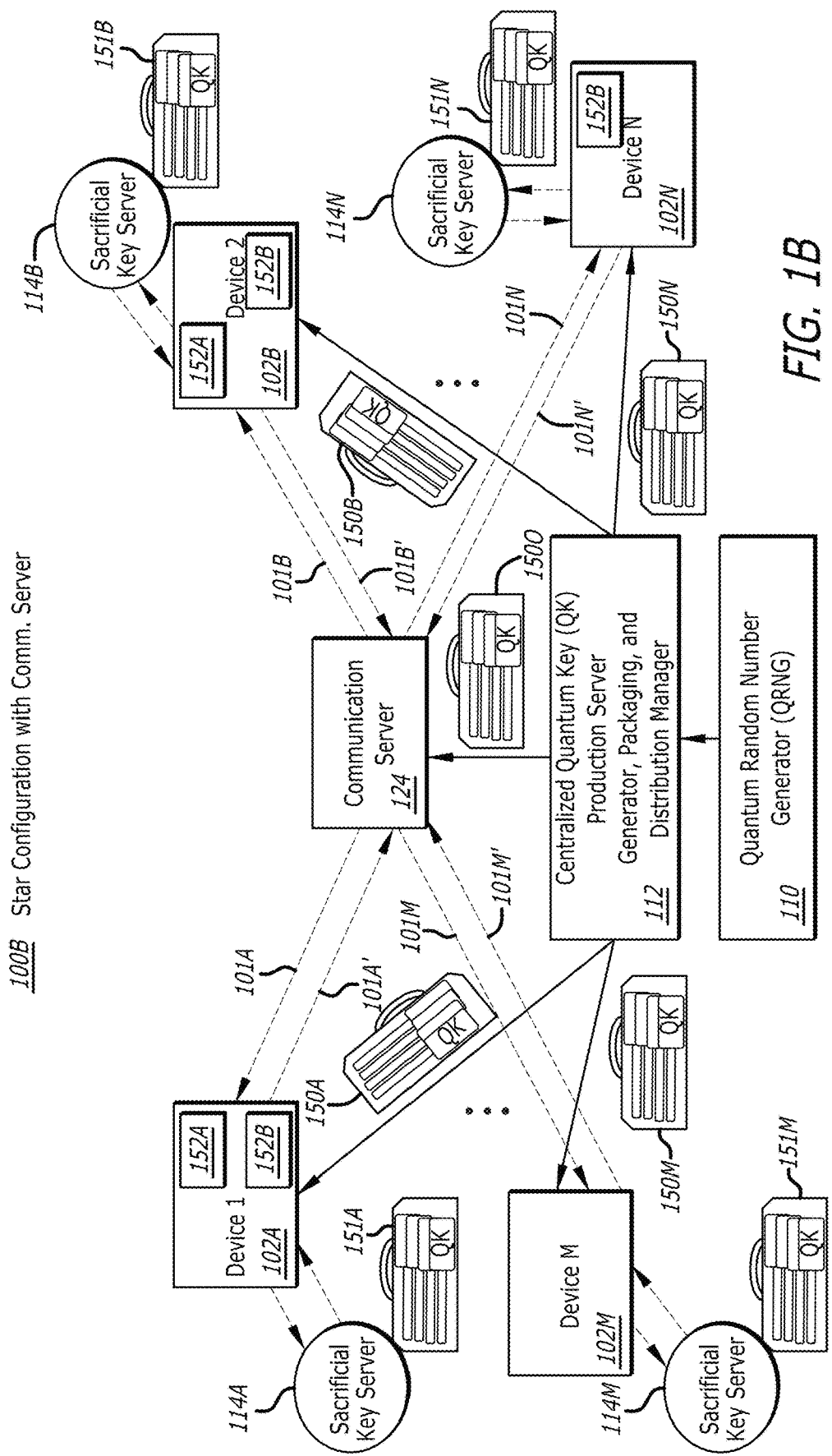
FIG. 1B is a functional block diagram of a cypher computer network with one or more secure communication channels (quantum tunnels) with a communication server that use packages with a plurality of symmetric production quantum keys.

Referring now to FIG. 1B, a star configured cypher communication network 100B is shown with a central communication server 124 to which the user devices 102A-102N can form quantum tunnels 101A-101N for secure communications between each in a many to many configuration. The central communication server 124 can receive a production key package 150O that is the same as the production key packages 150A-150N that each of the user devices 102A-102N receive. In one embodiment, the production key package and plurality of cypher keys is the same for each user device 102A-102N and the central communication server 124. A central sacrificial key server 114, such as shown in FIG. 1A, can be used to send sacrificial send keys, receive sacrificial return keys, and gain access to the production keys. In the embodiment shown in FIG. 1B, each user device 102A-102N receives a different production key package and is associated with a different sacrificial key server 114A-114N. The central communication server 124 receives each different production key package to form different quantum tunnels 101A-101N,101A'-101N' and secure communication channels with each respective user device 102A-102N. The user devices 102A-102N can securely communicate to each other through the central communication server 124. The user devices 102A-102N communicate different sacrificial send keys to the respective sacrificial key servers 114A-114N to receive different sacrificial return keys back. Accordingly, each of the production key packages 151A-151N differs for the respective user devices 102A-120N. The central communication server 124 can be used to synchronize key changes so that each of the plurality of user devices 102A-102N concurrently change to the next production key.

Key Packages

FIG. 1A illustrates production key packages 150A-150N, with a plurality of quantum cipher keys, being sent to user devices that can be used for encryption and decryption (cryptography) of data/text over a secure bidirectional communication channel. The first production key packages can be physically delivered and loaded into the user devices. Secondary production key packages can be electronically delivered over a secure bidirectional communication channel.

Figure 2A:
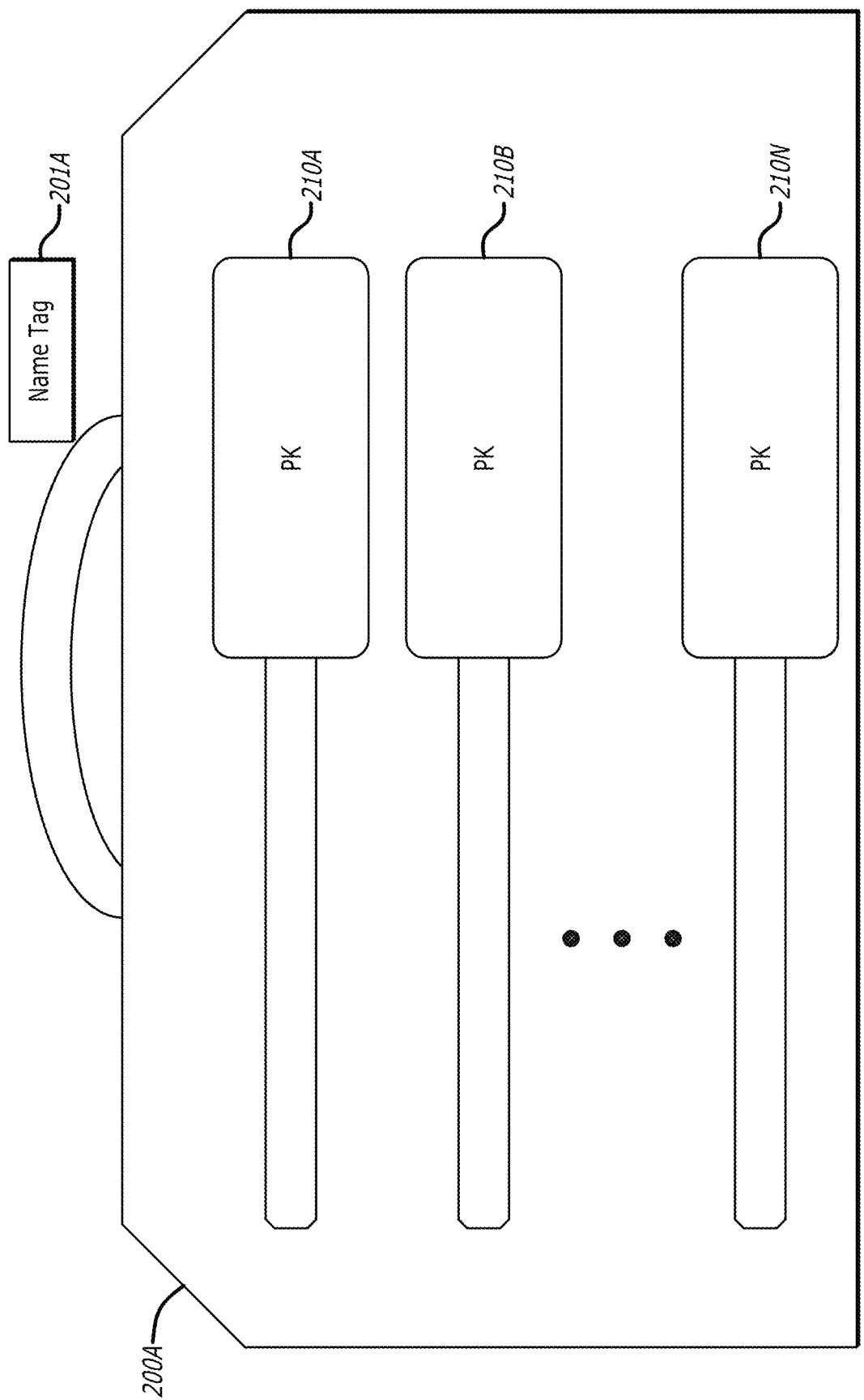
FIGS. 2A-2B are diagrams illustrating the different types of packaging that can be used for a plurality of symmetric quantum cipher keys to form a key package.
Figure 2B:
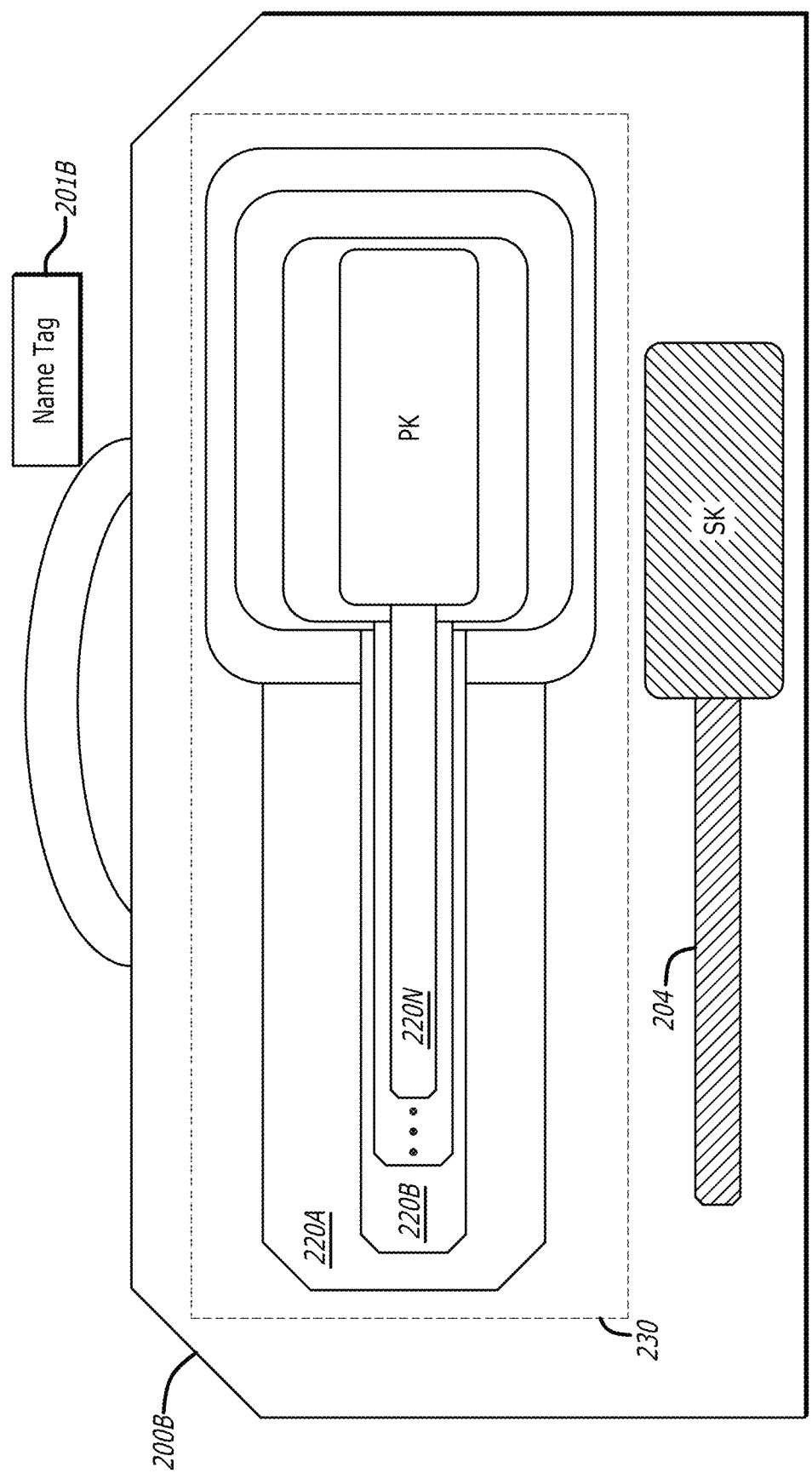
Figure 2C:
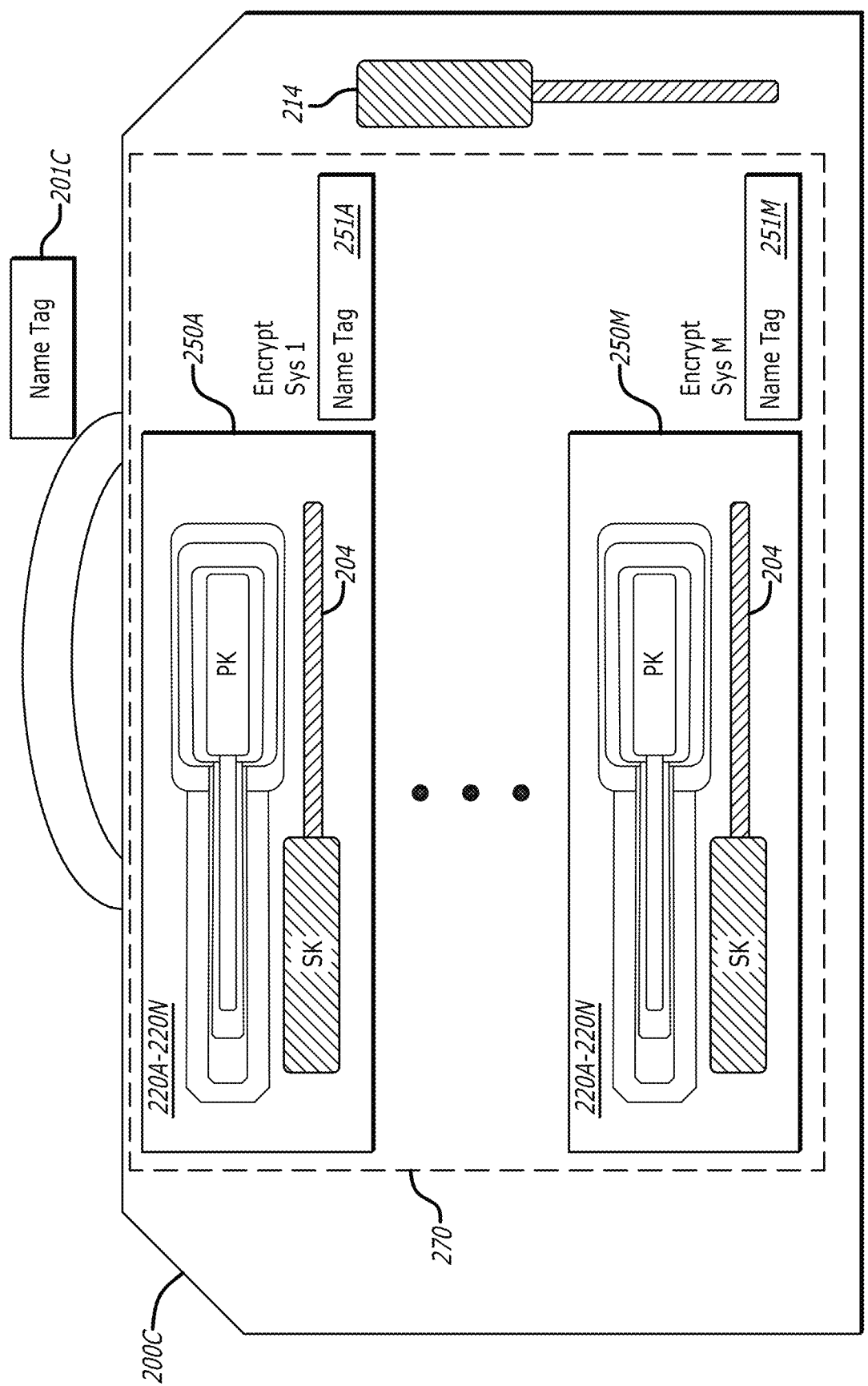
FIG. 2C is a diagram illustrating a packaging of different sets of a plurality of symmetric quantum cipher keys for different cypher algorithms and/or different cypher settings for the same cypher algorithm.

Referring now to FIGS. 2A-2C, different types of packing is shown that can be used to pack together a plurality of symmetric cipher (production) keys and one or more sacrificial send keys as a payload that can be used to form a production key package 200A-200C. A sacrificial key package, with one or more sacrificial return keys, can be paired with the production key package.

In FIG. 2A, the key package 200A can include a name tag (e.g., file name) 201A and a plurality of production cypher keys 210A-201N at a single level. The name tag 201A of a production key package can be used as an initial sacrificial send key to initially encrypt a paired sacrificial key package for delivery. A sacrificial return key can be used to initially encrypt the production key package for delivery. The sacrificial return key can be part of the sacrificial key package.

After delivery of the production key packages to the user devices and the sacrificial key package to a key server, the name tag 201A can be sent by a user device to the sacrificial key server to decrypt the sacrificial key package. From the decrypted sacrificial key package, an initial sacrificial return key can be retrieved and sent back from the server to the user device. The initial sacrificial return can be used to decrypt the encrypted production key package. The name tag 201A of a sacrificial key package and a production key package paired together can have a matching portion to show their paired relationship amongst a plurality of key packages. Accordingly, the name tag (file name) 201A can be used to start a process to decrypt and access an initial one of the plurality of production cypher keys 210A-201N. If files are encrypted below a top level, another sacrificial return key can be used to start a process to decrypt and access to decrypt an encrypted file to access a production cypher key.

In FIG. 2B, the key package 200B can include a name tag (e.g., file name) 201B, at least one sacrificial send cipher key 204, and a plurality of production cypher keys 220A-220N nested inside each other, cascaded into a plurality of levels of directories or file folders (also referred to herein as file folder directories). The at least one sacrificial send key 204 can provide a way to decrypt and access at least one of the plurality of production cipher keys 220A-220N at a first level. Accessing other cypher keys can require other sacrificial return keys to decrypt and access the encrypted files containing cypher keys and sacrificial return keys. As explained previously, the name tag 201B can act as an initial sacrificial send key that can be sent to a sacrificial key server to start the process of gaining access to the plurality of production cypher keys 210A-201N 210A-210N. A sacrificial return key from a server, based on the name tag 201B, can be used to decrypt the production key package 200B. To access the cypher keys, instead of the name tag 201B of the package, an internal unencrypted sacrificial send key 204 can be sent to the server in order to receive another sacrificial return key. The sacrificial return key can then be used to decrypt an encrypted file/folder 230 to gain access to a first production key 220A. Additional sacrificial send keys 204 in the production package can be used to send to a key server, receive a sacrificial return key, decrypt another encrypted file and gain access to another production key.

Referring now to FIG. 2C, the key package 200C can include a name tag (e.g., file name) 201C, at least one sacrificial send cipher key 214, and an encrypted file folder/directory 270 with one or more encrypted sets 250A-250M of at least one sacrificial send cipher key 204 and a plurality of production cypher keys 220A-220N nested inside each other, cascaded into a plurality of levels of directories/file folders.

One or more of the encrypted sets 250A-250M can have the plurality of production cypher keys 220A-220N generated differently by a different cypher algorithm for use with different cypher networks using the different cypher algorithms to encrypt and decrypt information. Alternatively, a user can have multiple quantum tunnels with different cypher networks and sets of users. The encrypted sets 250A-250M can use the same cypher algorithm but be used with different cypher networks and thus have different cypher keys for the different network. The encrypted sets 250A-250M can use the same cypher algorithm but different bit lengths such that the cypher keys 220A-220N are generated differently for the different bit lengths.

The name tag 201C can act as a sacrificial send key and provide a way to receive a sacrificial return key to decrypt the package 200C. The name tag (file name) can be sent to a sacrificial key server to receive back a sacrificial return key. The sacrificial return key can be used to decrypt the package 200C with a predetermined cypher algorithm. The sacrificial send cipher key 214 can provide a way to receive another sacrificial return key to decrypt and access the encrypted file folder/directory 270. A name tag (file name) 251A-251M associated with each of the one or more encrypted sets 250A-250M can act as an initial sacrificial send key to seek a sacrificial return key and decrypt the set of keys. Accessing the various keys and levels within each set 250A-250m can require other sacrificial send keys 204 to decrypt and access each level of production cypher keys 220A-220N with a sacrificial return key.

A production key package 200A-200C includes one or more sets of a plurality of symmetric quantum cypher keys 210A-210N,220A-220N that can be distributed so that a user can easily transition from one cipher key to another to encrypt/decrypt information (data and/or text). One or more sets of a plurality of sacrificial return keys can be similarly packaged as a sacrificial key package similar to a production key package 200A-200C.

Production Key Package

Figure 3A:
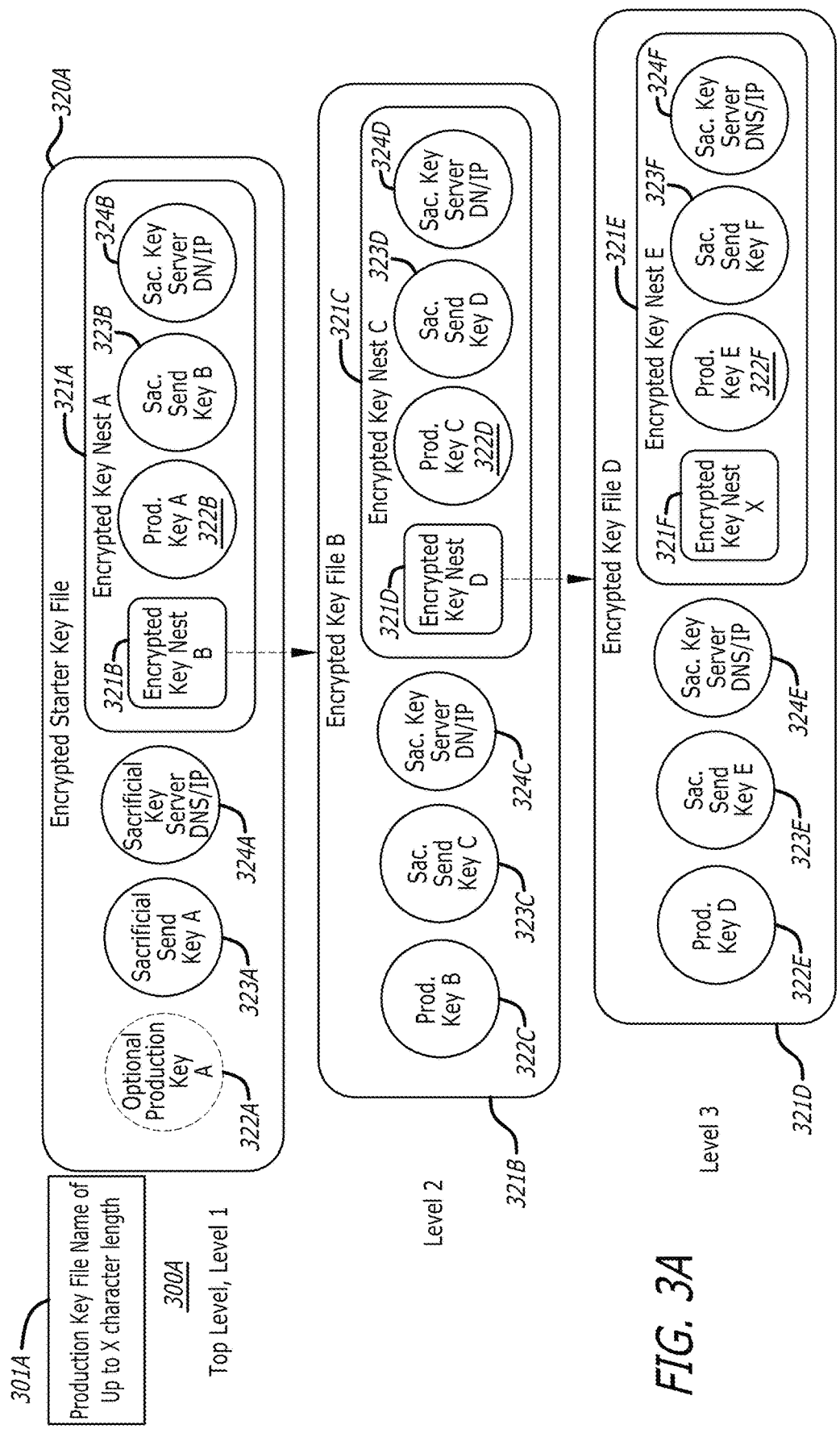
FIG. 3A is a diagram of a production key package that includes a plurality of nested encrypted key files securely storing a plurality of symmetric quantum production keys that can be used for encryption and decryption of data and text.

Referring now to FIG. 3A, a production key package 300A is shown that can be sent to at least two devices to encrypt and decrypt text and/or data. Generally, the production key package 300A is a cascaded (nested) set of directories, starting with a top level folder directory 320A, that are encrypted within each other using a quantum random number generator (QRNG) to form symmetric encryption/description (cipher) keys. Associated with the top level folder directory 320A, the production key package 300A has a production key file name 301A that is unencrypted. The production key file name 301A can act as an initial sacrificial send key when sent to a sacrificial key server. The production key file name 301A has a predetermined character length of up to X characters, such as 256 characters for example. Each encrypted file 321A-321F nested within a production key package can be assigned a file name that can act as a sacrificial send key when sent to a sacrificial key server. The file name of each encrypted file 321A-321F can include a matching character portion to that of file names of sacrificial return keys in a sacrificial key package. The file name of each encrypted file 321A-321F can also include the network address of the sacrificial key server to which to send the sacrificial send key. Alternatively, one or more sacrificial send keys 323A-323F and one or more network addresses 324A-324F can be included in the production key package 300A for sending a sacrificial send key 323A-323F to a key server at a specified network address 324A-324F.

The production key package 300A is encrypted with a predetermined symmetric cypher (encryption/decryption) algorithm. Knowing the predetermined symmetric cypher (encryption/decryption) algorithm, the production key package 300A can be decrypted at a portion of a first top level using the sacrificial key file name 301, but no further.

At a top level, level 1, the production key package 300A includes a first sacrificial send key 323A, a first sacrificial key server address 324A, and a first encrypted key file 321A. The first encrypted key file 321A includes a second encrypted key file 321B, a first production key 322B, a second sacrificial send key 323B, and a second sacrificial key server address 324B. Sacrificial key server addresses can be either an internet protocol (IP) address or a domain name (DN/DNS) address.

With the sacrificial production key file name 301, the first sacrificial send key 323A and the first sacrificial key server address 324A can be decrypted to clear text. However, the first encrypted key file 321A remains encrypted by a sacrificial return key saved in a sacrificial key server. The sacrificial return key can only be accessed by sending a sacrificial send key, such as the first sacrificial send key 323A, to a sacrificial key server. A sacrificial key server at the first sacrificial key server address 324A is used to receive a sacrificial return key based on the first sacrificial send key 323A. The sacrificial key server can be a virtual server temporarily executed to receive the sacrificial send key and transmit back a sacrificial return key based on the sacrificial send key.

Figure 5A:
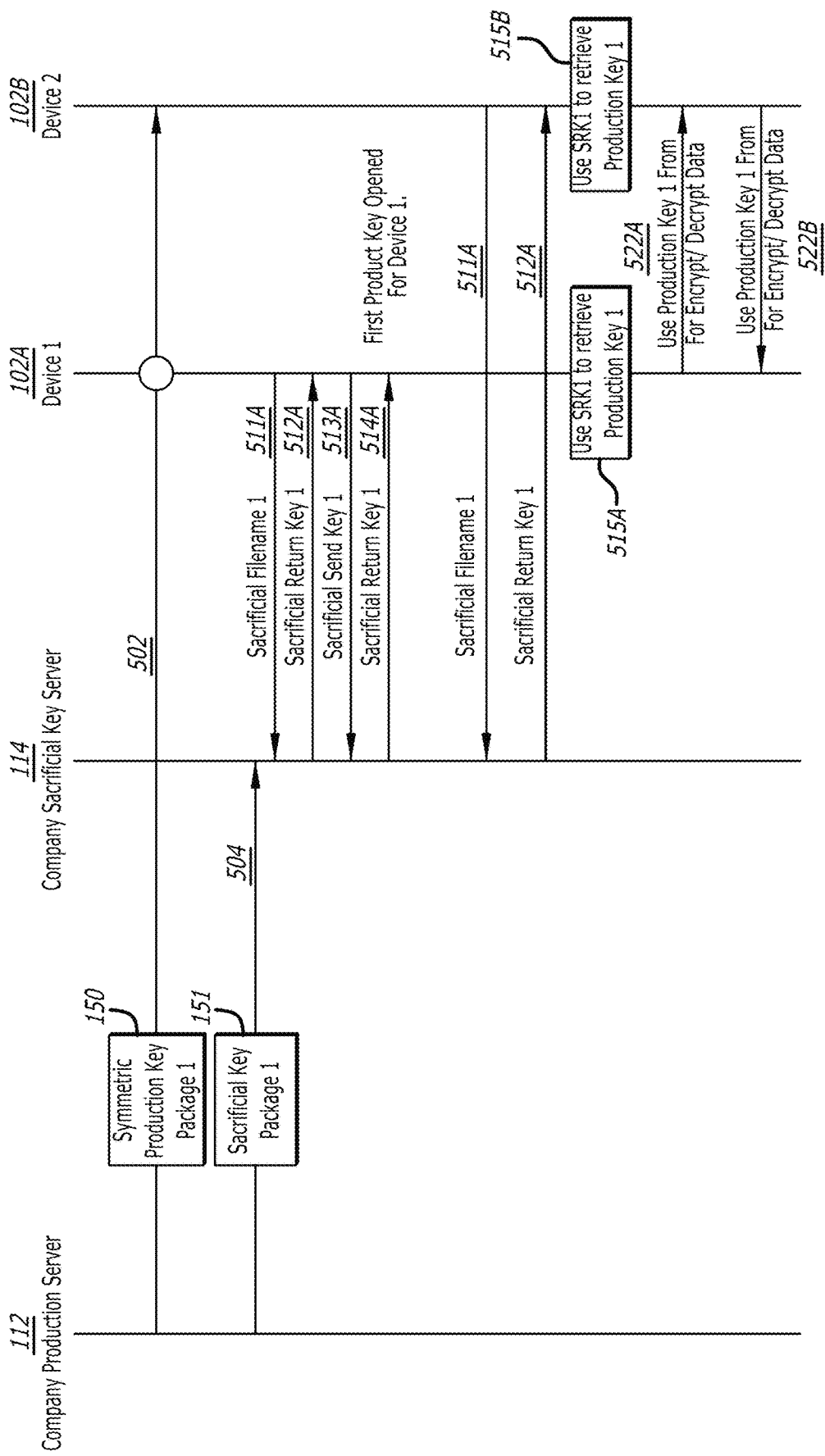
FIGS. 5A-5B are data flow diagrams illustrating set up of a secure communication channel between devices using the initial symmetric quantum cipher keys in a production key package.

At a top level, the production key package 300A can optionally include an initial production key 322A to avoid a verification process. Without the initial production key 322A, the sacrificial send key 323A and first sacrificial key server address 324A can be used to perform an initial key relay process between each device and the sacrificial key server, as is shown in FIG. 5A by reference numbers 511-514, between device 1 and the sacrificial key server.

At the next level, level 2, the second encrypted key file 321B includes a second production key 322B, a second sacrificial send key 323B, a second sacrificial key server address 324B and a third nested encrypted key file 321C. The third nested encrypted key file 321C includes a fourth nested encrypted key file 321D, a third production key 322C, a third sacrificial send key 323C, and a third sacrificial key server address 324C.

At the next lower level, level 3, the second encrypted key file 321D includes a second production key 322D, a second sacrificial send key 323B, a second sacrificial key server internet protocol (IP) address 324B or domain name (DN) and a third encrypted key file 321C. The third encrypted key file 321C includes a third encrypted key file 321D, a third production key 322C, a third sacrificial send key 323C, and a third sacrificial key server internet protocol (IP) address 324C.

The nesting of encrypted key files with sacrificial send keys and a respective sacrificial key server address in the production key package 300A can continue on and on for a predetermined number of levels until a last level Y providing a total of at least Y+1 production keys that can be used for encrypting/decrypting information between a plurality of devices. The first and the last level Y of the key package 300A can differ somewhat from the other levels between them. The top level, or first level, may or may not include the optional production key 322A. The last encrypted file 321 of the last level Y of the production key package would not include another nested encrypted key file 321. The last encrypted file would then need not to include a sacrificial send key 323 and a sacrificial key server network address 324. The last encrypted file 321 can include a last production key 322. The last encrypted file for the production key package 300A would like the encrypted file 321 shown in FIG. 3C, but with one production key 322.

The nested number of production keys can be predetermined based on the package levels. Accordingly, a key update schedule can be set based on time/date (e.g., hourly-hours, daily-days, weekly-weeks, monthly-months, yearly-years) so that the plurality of nested number of keys does not run out over a period of time until a planned update (e.g., weekly, monthly, annually). Of course, a key update can be event driven (e.g., hack, loss of equipment) as well such that the plurality of keys can be used up before the planned update. A user device can request another production key package before the first production key package runs out, such as when a few production keys remain available in the current production key package, before it runs out of production keys.

Sacrificial Key Package

Figure 4A:
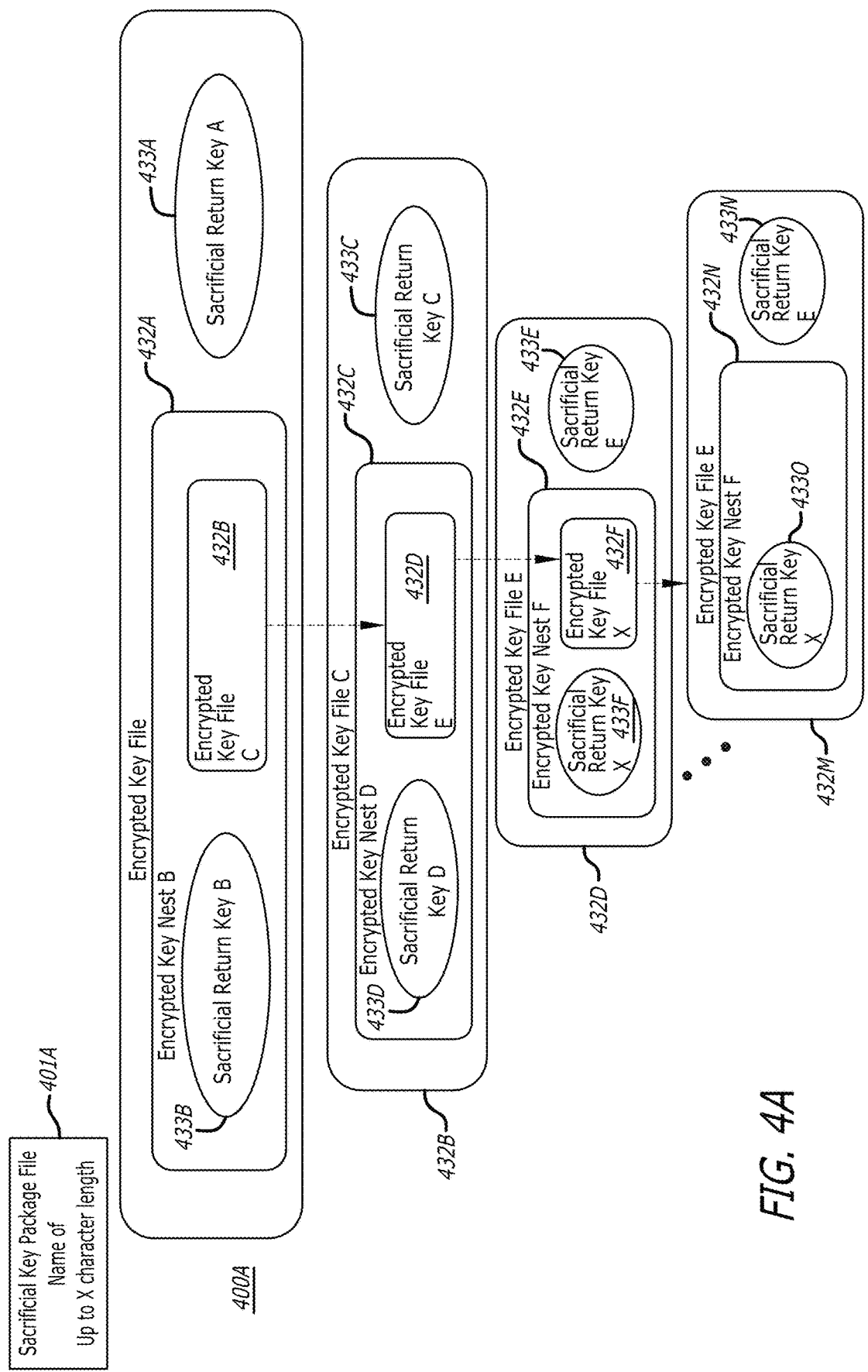
FIG. 4A-4C are diagrams of sacrificial key packages that includes a plurality of nested encrypted key files securely storing a plurality of symmetric quantum sacrificial return keys that can be used to decrypt the encrypted key files securely storing the plurality of symmetric quantum production keys.

Referring now to FIG. 4A, a sacrificial key package 400A is shown that can be sent to one or more sacrificial key servers. The sacrificial key package 400A includes a plurality of sacrificial return keys 433A-433N that are cascaded or nested inside one another at different levels. A sacrificial return key is returned by the server to a device that sends a sacrificial send key. Generally, the sacrificial key package 400A is a cascaded (nested) set of directories that are encrypted within each other using a quantum random number generator (QRNG) to form symmetric encryption/description (cipher) keys.

The sacrificial key package 400A has a sacrificial key package file name 401A that is unencrypted. The sacrificial key package file name 401A can act as an initial decryption key to decrypt the first level of the sacrificial key package 400A. The sacrificial key package file name 401A has a predetermined character length of Y characters with a matching portion of X characters to that used in the file name for the production key package, so they form an identifiable pair of key packages. For example, the first 32 characters in the sacrificial package key file name 401A and production key file name 301 can be identical so that a key server knows what sacrificial key package to look up when receiving a sacrificial send key with the partial matching name. The network address (IP address or domain name address) of the sending user device of the sacrificial send key is used by the sacrificial key server to return the sacrificial return key to the appropriate device.

The sacrificial key package 400A can be encrypted with the same predetermined symmetric cypher (encryption/decryption) algorithm as the production key package 300A but using different keys, that can be the others file name. Knowing the predetermined symmetric cypher (encryption/decryption) algorithm, a portion of the first top level of the sacrificial key package 400A can be decrypted using the sacrificial key file name 401A, but no further.

At a top level, level 1, the sacrificial key package 400A includes a first sacrificial return key 433A, and a first encrypted key file 432A. The first encrypted key file 432A includes a nested second encrypted key file 432B, and a second sacrificial return key 433B.

With the sacrificial key package file name 401A, the first sacrificial return key 433A can be decrypted to clear text. However, the first encrypted key file 432A remains encrypted by the next sacrificial send key in the production key package saved by the devices. A sacrificial key server needs to receive a sacrificial send key from a device to decrypt the first encrypted key file 432A.

At the next level, level 2, the nested second encrypted key file 432B includes a second sacrificial return key 433C, and a third nested encrypted key file 432C. The third nested encrypted key file 432C includes a fourth nested encrypted key file 432D, and a fourth sacrificial return key 433D.

At the next lower level, level 3, the third nested encrypted key file 432D includes a fourth nested encrypted key file 432E, and a fifth sacrificial return key 433E. The fourth nested encrypted key file 432E includes a fifth nested encrypted key file 432F, and a sixth sacrificial return key 433F.

The nesting of encrypted key files with sacrificial return keys in the sacrificial key package 400A can continue on and on for a predetermined number of levels until a last level Y providing a total of at least Y+1 sacrificial return keys that can be returned to the devices for gaining access to the next production key.

At a last level of the sacrificial key package 400A, the nested encrypted key file 432M includes a last nested encrypted key file 432N, and a next to last sacrificial return key 433N. The last nested encrypted key file 432N that is encrypted includes the last sacrificial return key 433O.

Upon running out of sacrificial return keys, the sacrificial key server can request a new sacrificial key package for the server matched that is paired with a new production key package for the user devices.

One Time Sacrificial Key Package and Server

Figure 3B:
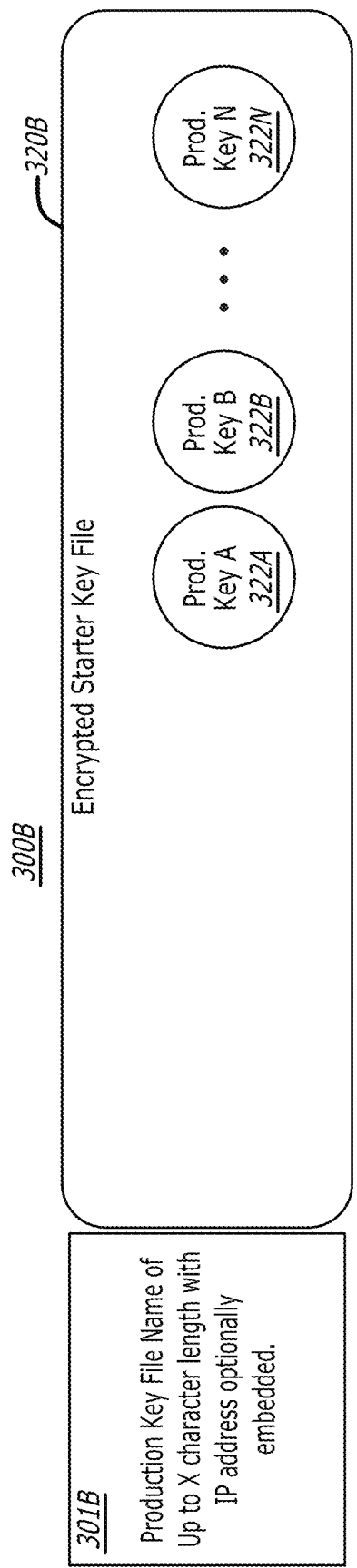
FIGS. 3B-3C are diagrams of production key packages with alternate hierarchy to store a plurality of symmetric quantum production keys that can be used for encryption and decryption of data and text.
Figure 3C:
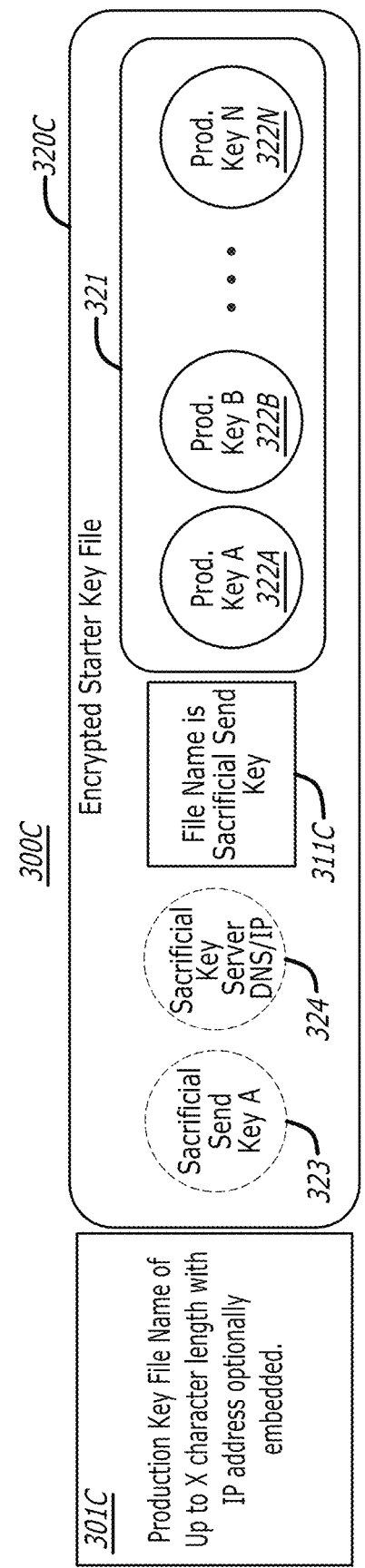

The production key package 300A shown in FIG. 3A can be simplified for use with one time sacrificial key packages while maintaining security features. FIGS. 3B-3C illustrate production key packages 300B-300C that can be used with one-time sacrificial key packages that have use once sacrificial return keys.

FIG. 3B illustrates a production key package 300B that has an encrypted file/directory 320B and a production key package file name 301B. The encrypted file/directory 320B includes a plurality of symmetric quantum production keys 322A-322N. A portion of the production key package file name 301B can include the network address of a sacrificial key server to which the file name 301B can be sent in order to receive a sacrificial return key. The sacrificial return key from the sacrificial key server can be used to decrypt the encrypted file/directory 320B, access the plurality of symmetric quantum production keys 322A-322N, and retrieve one symmetric quantum production keys for use to decrypt/encrypt data.

FIG. 3C illustrates a production key package 300C that has an encrypted file/directory 320C and a production key package file name 301C. The production key package 300C includes verification over that of production key package 300B. The encrypted file/directory 320C includes an encrypted file 321 with a file name 311C. The file name 321 can act as a sacrificial send key to a predetermined key server network address or the encrypted file/directory 320C can optionally include a sacrificial send key 323 and a sacrificial key server network address 324 that are encrypted together with the encrypted file 321. The encrypted file 321 includes a plurality of symmetric quantum production keys 322A-322N that are encrypted together. A portion of the production key package file name 301C can optionally include a network address of a sacrificial key server to which the file name 301C can be sent in order to receive a sacrificial return key. The sacrificial return key from the sacrificial key server can be used to decrypt the encrypted file/directory 320C to access and retrieve the sacrificial send key 323 and the sacrificial key server network address 324. The sacrificial send key 323 can be transmitted by a device to the sacrificial key server at the sacrificial key server network address 324. A second sacrificial return key back from the sacrificial key server can be used to decrypt the encrypted file 321 and gain access to the plurality of symmetric quantum production keys 322A-322N. One of the symmetric quantum production keys can be retrieved and uses to decrypt/encrypt data.

The sacrificial key package 400B includes a plurality of sacrificial keys for a sacrificial key server. However, to further improve security, a one-time sacrificial key package can be used with a temporary one time virtual sacrificial key server having a temporary network address. The temporary one time virtual sacrificial key server is started up and executed upon receipt of a sacrificial send key. Alternatively, temporary sacrificial key server applets (or containers) can be started up and executed by a virtual server to service received sacrificial send keys. The sacrificial key server/applets can be split up into an access key server and a sacrificial key server to server one time sacrificial keys. The access key server is used to verify user access to an encryption network system. The sacrificial key server performs the role of processing sacrificial send keys to support the opening of encrypted levels of quantum keys for use in the data cypher (encryption and decryption) process of data and/or text.

Figure 4B:
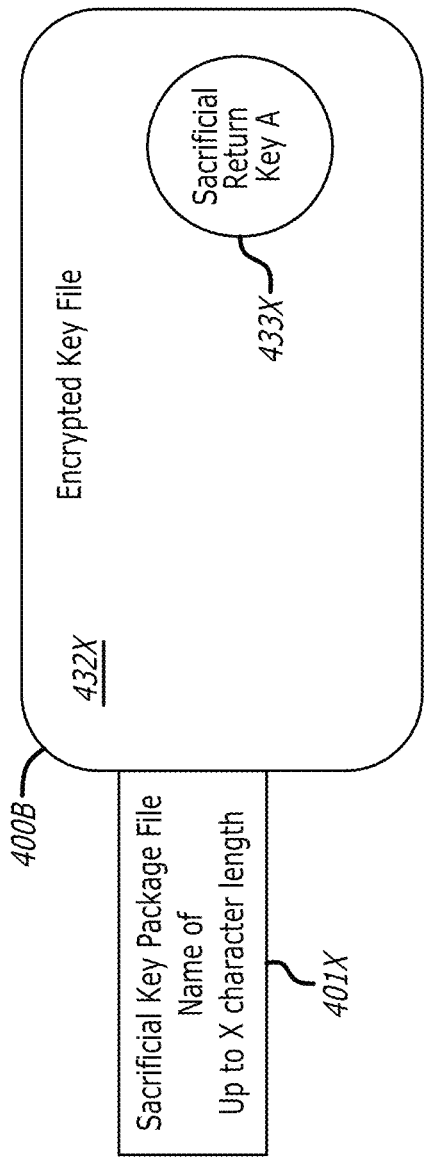

Referring now to FIG. 4B, a one-time (use once) sacrificial key package 400B is shown that can be associated with a production key package 300A-300C shown in FIGS. 3A-3C. The one time sacrificial key package 400B includes an encrypted directory/file folder 432X that includes a sacrificial return key 433X. The one time sacrificial key package 400B has a file name 401X of up to X characters in length that is associated with a file name of a production key package. The one time sacrificial key package 400B is a use once package that only uses the sacrificial return key 433X once and deletes it after being used the one time.

Each one time sacrificial key package 400B is generated to be associated with one encrypted file of one production key in a production key package 300A-300C, for a specific user and device. Each user/device receives a unique production key package associated with their network address. For example, the one-time sacrificial key package 400B can be associated with the production key package 300B to open up the encrypted file that includes a plurality of production keys 322A-322N. The one time sacrificial key package 400B is stored on a physical server ready to be accessed when receiving a sacrificial send key from the associated production key package. A one-time virtual key server (or OS container, or applet) can be established when the physical server receives the sacrificial send key from the device associated with the one time sacrificial key package.

Figure 4C:
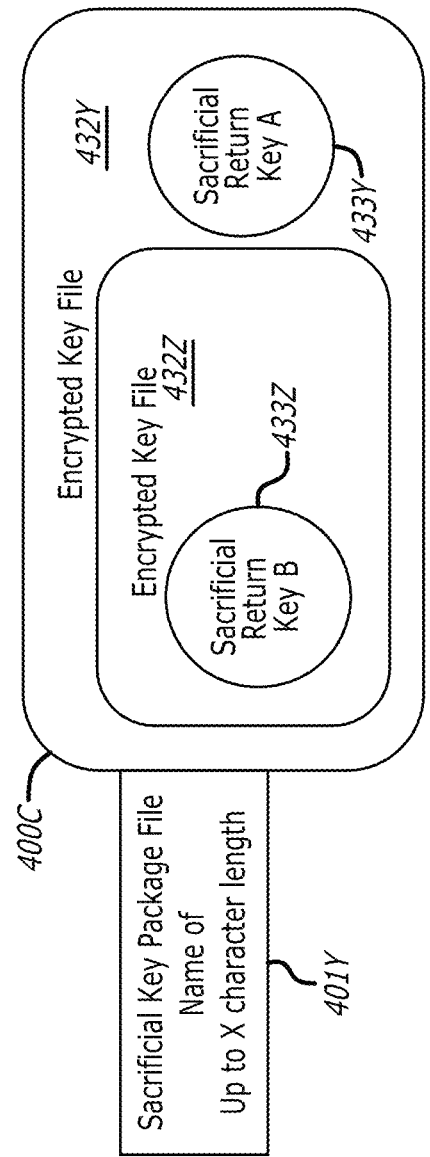

Referring now to FIG. 4C, it may be desirable to verify communications between devices and the sacrificial key server (or OS container, or applet) has occurred. The communication between device and server can be infrequent or one time only so that verified communication is important and lead to a more robust key distribution system. To provide verification, a one-time (use once) sacrificial key package 400C can be formed in association with a production key package 300A-300C shown in FIGS. 3A-3C. Communication verification is shown during an initialization process by data flows 511A,512A,513A,514A between server 114 and device 102A as shown in FIG. 5A.

The one time sacrificial key package 400C includes an encrypted directory/file folder 432Y that includes a sacrificial return key 433Y and an encrypted file 432Z. The encrypted file 432Z further includes a nested sacrificial return key 433Z. The one time sacrificial key package 400C has a file name 401Y of up to X characters in length that is associated with a file name of a production key package. The one time sacrificial key package 400C uses the sacrificial return key 433Y and deletes it after being used and waits for the next sacrificial send key from the same device to gain access to the nested sacrificial return key 433Z. The verification process with the sacrificial key package 400C can provide added security over that of the sacrificial key package 400B.

Each one time sacrificial key package 400C is generated to be associated with one encrypted file of one or more production keys in a production key package 300A-300C, for a specific user and device. Each user/device receives a unique production key package associated with their network address. For example, the one-time sacrificial key package 400C can be associated with the production key package 300C to open up the encrypted file 321 that includes a plurality of production keys 322A-322N. The one time sacrificial key package 400C is stored on a physical server ready to be accessed when receiving a sacrificial send key from the associated production key package. A one-time virtual key server (or OS Kubernetes or Kubernetes like container, or applet) can be established when the physical server receives the sacrificial send key from the device associated with the one time sacrificial key package.

Methods of Key Package Usage

Figure 5B:
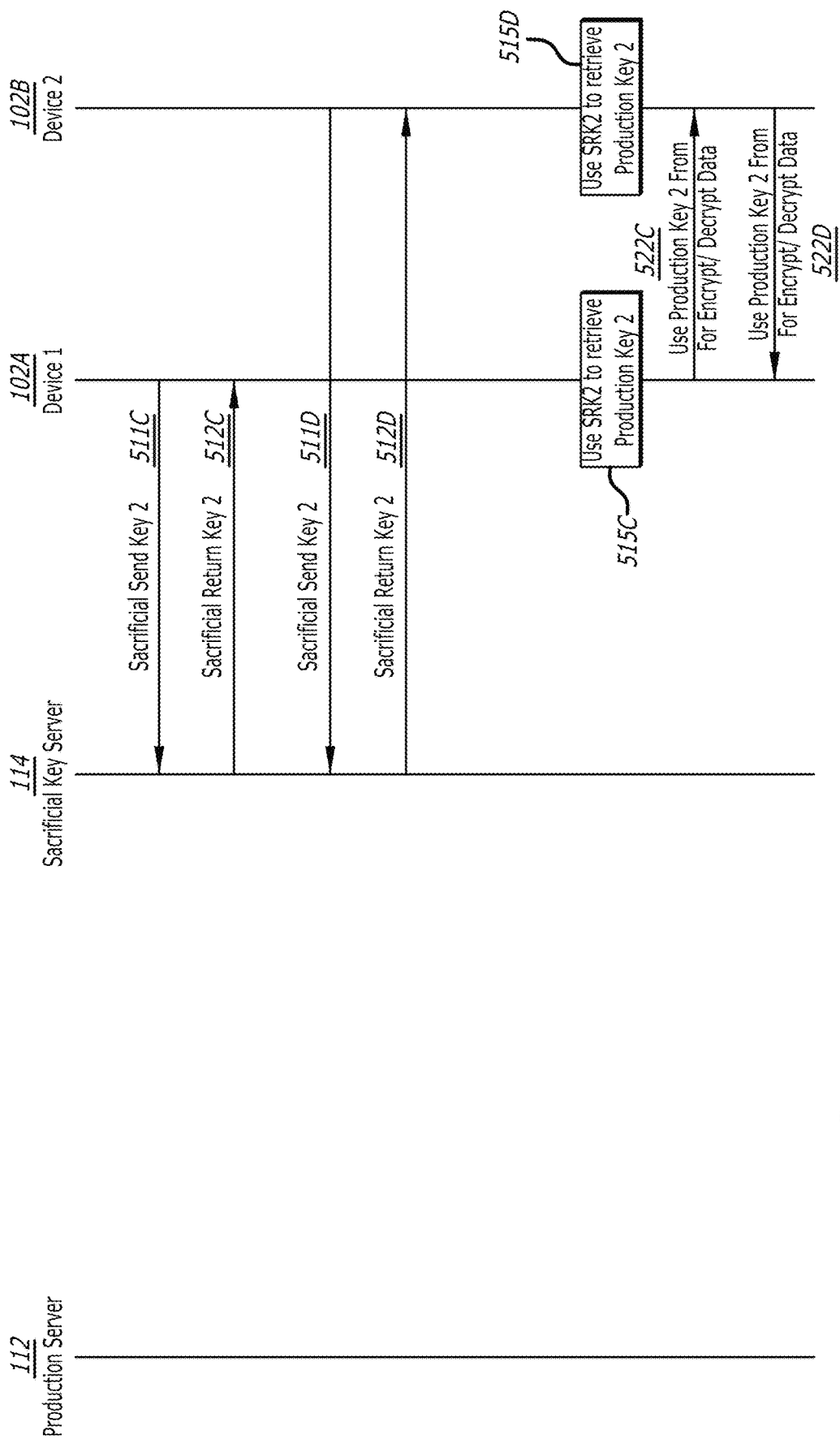

Referring now to FIGS. 1, and 5A-5B, data flow diagrams illustrate the set-up of a secure communication channel between devices using the initial symmetric quantum cipher keys in a production key package with a plurality of quantum production keys.

The production server 112 forms a first quantum production key package 150 having a production key package filename. The first quantum production key package 150 is an encrypted file with a plurality of quantum production keys as discussed herein. The production server 112 further forms a first quantum sacrificial key package 151 with a sacrificial key package file name associated with a portion of the first production key file name. The first quantum sacrificial key package 151 is an encrypted file with a first sacrificial return key. At process 504, the first quantum sacrificial key package 151 is sent by the production server 112 to a sacrificial key server 114. At process 502, the first quantum production key package 150 is sent by the production server 112 to a plurality of computer devices 102A-102B to set up a quantum key encryption tunnel 101 between the plurality of computer devices.

The sacrificial key server 114 receives the first quantum sacrificial key package 151 and stores it in a local storage device associated with the server.

The plurality of computer devices 102A-102B receive the first quantum production key package 150 and stores it in a local storage device associated with the device. Upon receipt, the devices 102A-102B send the first production file name to the sacrificial key server as indicated by processes 511A-511B. The sacrificial key server 114 receives the first production file name and retrieves the first sacrificial return key from the sacrificial key package 151. The sacrificial key server 114 transmits the first sacrificial return key to the devices 102A-102B as indicated by processes 512A-512B. The devices receive the first sacrificial return key from the sacrificial key server. Each of the devices can verify to the server they have received the first sacrificial return key by repeating a send of the first production file name (or first sacrificial send key) to the sacrificial key server as indicated by process 513A. The server 114 can verify back to each device by repeating the transmission of the sacrificial return key back to the device 102A such as indicated by process 514A.

With the first sacrificial return key received from the sacrificial key server, the devices can use the first sacrificial return key to decrypt an encrypted key file 321A of the first quantum production key package 150 that has the plurality of quantum production keys nested in encrypted key files within its different levels. At processes 515A-515B, the devices can further retrieve a first quantum production key 322B of the plurality of quantum production keys out of the first quantum production key package 150. With the first quantum production key 322B, a symmetric quantum cypher key, the devices 102A-102B can use it to encrypt data 522A,522B to send to each other or other devices of a plurality of devices that receive the production key packages. The devices can also use the first quantum production key to decrypt data 522A,522B received from another device that encrypted data with the same key, the first quantum production key.

The sacrificial key server receives a first production file name 511A,511B, or a sacrificial send key from one computer device of the plurality of computer devices and uses it to decrypt the sacrificial key package. The sacrificial key server further retrieves the first sacrificial return key based on the first production file name 511A,511B and returns it back to the one computer device of the plurality of computer devices that sent the sacrificial send key.

The process performed by the devices and the sacrificial key server can be repeated over and over again up to the amount of production keys that are available in the production key package. As shown in FIG. 5B, a sacrificial send key 511C is transmitted from the device 102A to the sacrificial key server 114. The sacrificial key server 114 transmits back the sacrificial return key 512C to the device 102A. A sacrificial send key 511D is transmitted from the device 102B to the sacrificial key server 114. The sacrificial key server 114 transmits back the sacrificial return key 512D to the device 102B.

With the sacrificial return keys 512C,512D received from the sacrificial key server, the devices can use the first sacrificial return key to decrypt a next encrypted key file 321B of the first quantum production key package 150 that has the plurality of quantum production keys nested in encrypted key files within its different levels. At processes 515C-515D, the devices can further retrieve a second quantum production key 322C of the plurality of quantum production keys out of their respective first quantum production key package 150. With the next symmetric quantum production key 322C, the devices 102A-102B can use it to encrypt/decrypt data 522C,522D to communicate with each other or other devices of a plurality of devices that receive the production key packages.

Prior to sending a key package, the key package needs to be formed with the plurality of production cypher keys and/or one or more sacrificial return keys. The first quantum production key package can be formed by generating, into a first file having a first production file name, a first plurality of quantum encryption keys using a quantum random number generator; and encrypting the first file with a predetermined encryption algorithm using the first production file name to form the first quantum production key package. The first quantum production key package is sent to the client computers that are to be a part of a cypher network. A plurality of different quantum production key packages can be generated for a respective plurality of different cypher networks with client computer devices. In one embodiment, the first quantum sacrificial key package can be formed by generating, into a file having a first sacrificial file name associated with a portion of the first production file name, a first sacrificial return key using a quantum random number generator; encrypting the file with a predetermined encryption algorithm using the first sacrificial file name to form the first quantum sacrificial key package.

The first sacrificial key package and the first production key package are an associated pair. The association can be made determinable through some sort of association indicator allows a server/device to easily determine which key package of a plurality of key packages to open when receiving a sacrificial send key or a sacrificial return key. One association indicator can be the package file name. The package file names can indicate the association by having the same set of X characters for example in a string of X+Y character length in the file name. Alternatively, there can be a slight known difference in the set of X characters, such as a first or last character being offset by a predetermined number of N characters in the alphabet or the ASCII code. For example, the last X characters in the production key package file name and the last X characters in the sacrificial key package file name can be used to indicate the association. For example, the initial X−1 characters in each file name can be the same to indicate the association but for the Xth. The Xth character can be offset in the sacrificial key package name by N characters in an ASCII code, for example. The offset can be backed out of the sacrificial key package file name or can be added into the production key package name to determine a match and an association. The association can be indicated differently from the file name, such as by sacrificial server network address or device network address for example. In any case, the indicated association allows a server/device to quickly determine which key package of a plurality of key packages to open when receiving a sacrificial send key or a sacrificial return key.

Figure 5C:
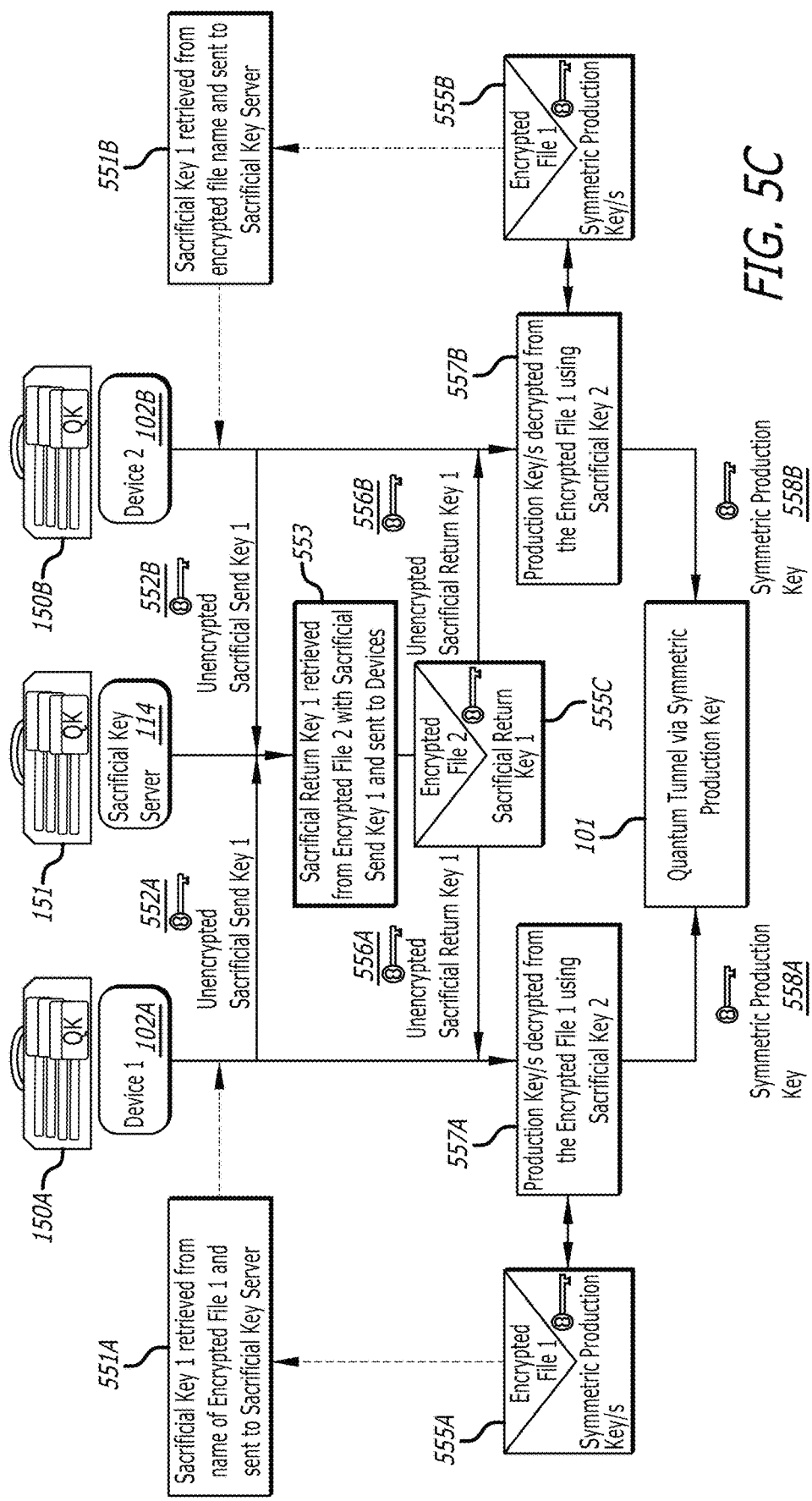
FIG. 5C is a flow chart diagram of the distribution of cipher keys between devices and servers in the computer network shown in FIG. 1A.

Referring now to FIG. 5C, a flow chart diagram of a production/sacrificial key cycle is shown. Each of the client computer devices 102A, 102B has their first production key package 150A-150B, having the same set of a plurality of symmetric quantum cypher keys in order to communicate with each other over a communication channel in a secure manner. The sacrificial key server 114 has its sacrificial key package 151 with one or more sacrificial return keys. The sacrificial send keys and the sacrificial return keys when transmitted are unencrypted keys that can be used by the receiving device to unencrypt an encrypted file holding a quantum key.

The client computer devices 102A,102B and the computer server 114 are coupled in communication with each other over a communication network, at least of portion of which can include the internet. The client computer devices are electronic devices with at least one storage device to store software instructions and/or data, and a processor that can execute the software instructions to process the data. The client computer devices can be wireless computer devices such as mobile wireless telephones (e.g., smartphones) and portable wireless computers (e.g., laptop computers) in wireless communication with the network. Additionally, the client computer devices can be wired computer devices, such as a desktop computer device, in wired communication with the network.

At process 551A-551B, the devices 102A-102B retrieve an initial sacrificial send key 552A-552B from the file name of the encrypted file 555A-555B within the production key package 150A-150B. In one embodiment, the file name is an initial unencrypted sacrificial send key. The initial sacrificial send keys 552A-552B are transmitted by the devices to the sacrificial key server 114 using a sacrificial key server network address.

At process 553, using the initial sacrificial send keys 552A-552B, the sacrificial key server 114 decrypts an encrypted key file 555C with a known cipher algorithm and retrieves a first sacrificial return key 556A-556B. The first sacrificial return key 556A-556B is sent back to the devices 102A-102B using the device network addresses (e.g., IP addresses).

At process 557A-557B, the devices 102A-102B use the sacrificial return keys 556A-556B to decrypt the encrypted files 555A-555B in the production key package 150A-150B to gain access to the symmetric production keys (quantum cypher key) 558A-558B. The symmetric production keys (quantum cypher key) 558A-558B are used by the devices 102A-102B to encrypt and decrypt data and text into cypher data and cypher text communicated over the communication network to form a quantum tunnel 101 between them for a secure communication channel.

Virtual private network (VPN) software, VPN hardware, or a combination thereof, can use the pre-shared quantum cypher keys to establish secure quantum tunnels 101 onto a cypher computer network (a wide area network) with a plurality of other devices 102A-102M. The VPN functionality can be VPN software executed by a processor in the devices, or be part of VPN firmware that is executed by a network interface card in the devices. Alternatively, the VPN functionality can be embedded in hardware of the routers at the edge of local area networks that is called up by the processors of the devices to form quantum tunnels with symmetric quantum cypher keys. To provide confidentiality, the VPN functionality includes a predetermined symmetric cypher algorithm that can both encrypt and decrypt data/text/information using one of the quantum cypher keys (production keys) in a production key package. The VPN functionality, as well as the process of distribution of quantum cypher keys by an access key server or production key server, can include user authentication to prevent unauthorized users from accessing the quantum tunnels.

Figure 6A:
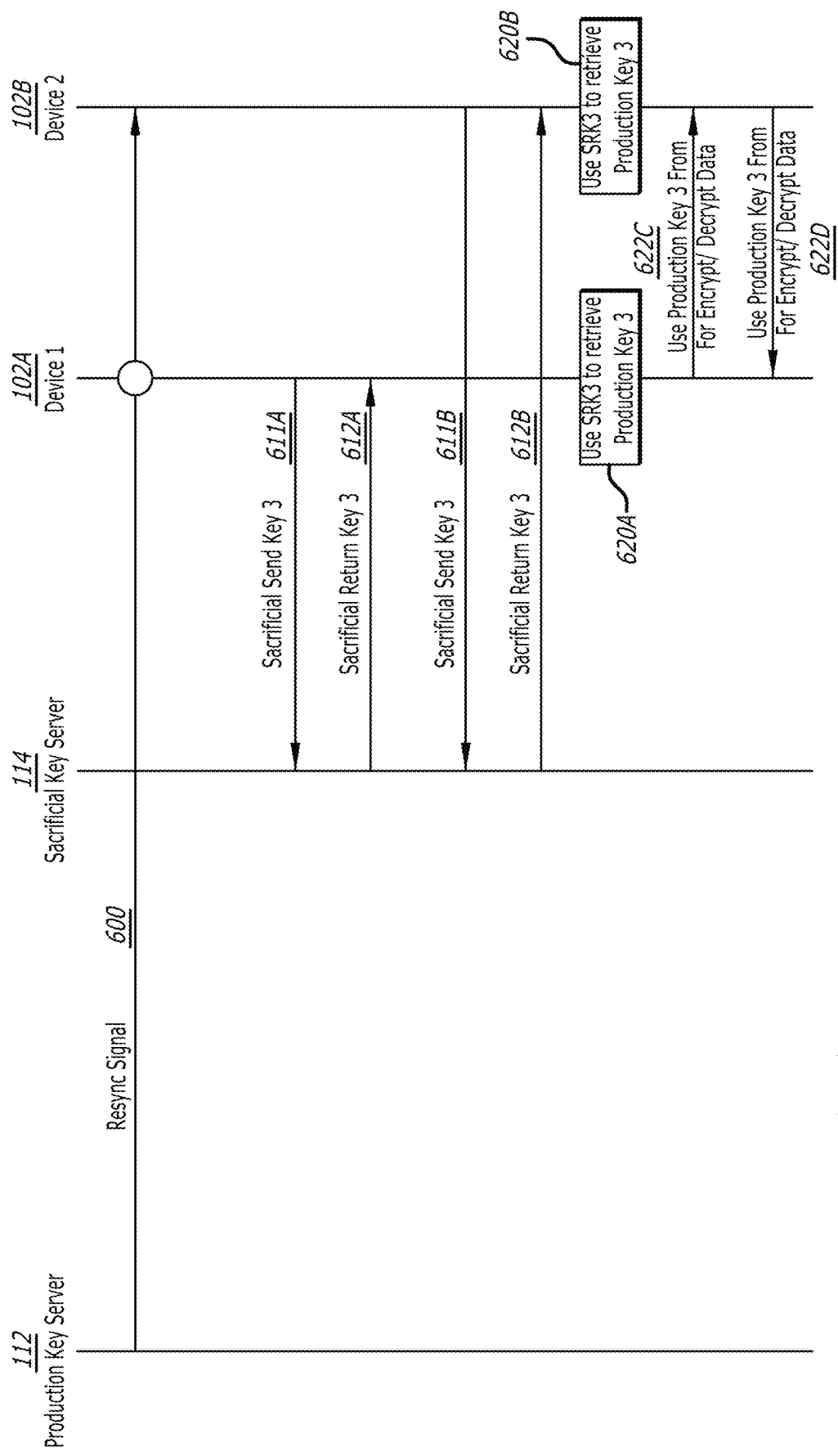
FIGS. 6A-6B are data flow diagrams illustrating a key update based on an event or otherwise to re-establish the secure communication channel between devices using a new set of symmetric quantum cipher keys in the production key package.

Referring now to FIGS. 6A, to make a communication network more secure, it is wise to periodically change cypher keys based on a synchronized time/date clock. It is also wise to change cypher keys when certain events occur (e.g., network hack, database hack) or when randomly signaled to do so. FIG. 6A illustrates a data flow diagram that shows a quantum cypher key update process. An event or otherwise a time period causes a key resync signal 600 to be transmitted from a production server 112 to the devices 102A-102B in a cypher network.

As shown in FIG. 6A, the client computer devices 102A-102B receive the key Resync signal 600 and go through a process to retrieve the next cypher key in order to re-establish the secure communication channel between devices using a new symmetric quantum cipher key in the production key package 150A-150B.

A sacrificial send key 611A is transmitted from the device 102A to the sacrificial key server 114. The sacrificial key server 114 transmits back the sacrificial return key 612A to the device 102A. A sacrificial send key 611B is transmitted from the device 102B to the sacrificial key server 114. The sacrificial key server 114 transmits back the sacrificial return key 612B to the device 102D.

With the sacrificial return keys 612A-612B received from the sacrificial key server, the devices can use the first sacrificial return key to decrypt a next encrypted key file 321C of the first quantum production key package 150 shown in FIG. 3A, that has the plurality of quantum production keys nested in encrypted key files within its different levels. At process 620A-620B, the devices can further retrieve a quantum production key 322D of the plurality of quantum production keys out of the quantum production key package 300A. With the next quantum production key 322D, the devices 102A-102B can use it to encrypt/decrypt data 622C,622D to communicate with each other or other devices of a plurality of devices that receive the production key packages.

Figure 6B:
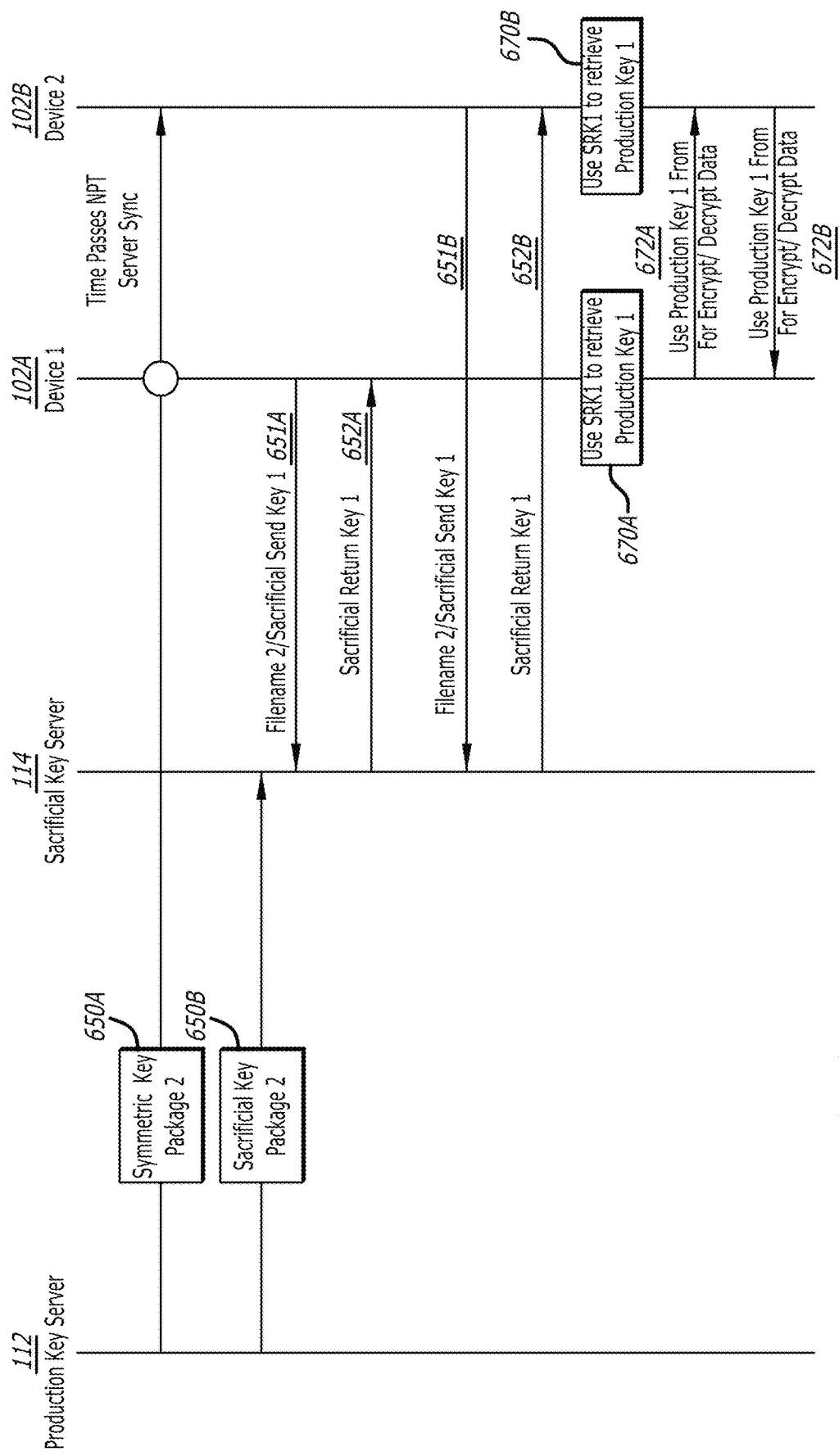

Referring now to FIG. 6B, to make a communication network more secure, it is wise to periodically change out the entire key package 150A-150B of cypher keys based on a synchronized time/date clock or before the cypher keys in a key package run out. FIG. 6B illustrates a data flow diagram that show a key package update process for both the production key package and the sacrificial key package.

After prior delivery of the first production key package and the first sacrificial key package and a passage of a predetermined time or other event, the production key server 112 sends a second production key package 650A with a plurality of quantum cipher keys to the devices 102A and 102B. The production key server also sends a second sacrificial key package 650B, associated with the second production key package 650A, to the sacrificial key server 114.

The first client computer device 102A sends an initial sacrificial send key 651A to the sacrificial key server 114. The sacrificial key server 114 sends a sacrificial return key 652A back to the first client computer device 102A. At process 670A, the first client computer device 102A uses the sacrificial return key 652A on the production key package 650A to decrypt, access and retrieve a symmetric quantum production key for use to encrypt/decrypt data.

The second client computer device 102B sends an initial sacrificial send key 651B to the sacrificial key server 114. The sacrificial key server 114 sends a sacrificial return key 652B back to the second client computer device 102B. At process 670B, the second client computer device 102B uses the sacrificial return key 652B on the production key package 650B to decrypt, access and retrieve a symmetric quantum production key for use to encrypt/decrypt data.

With the sacrificial return keys 652A-652B received from the sacrificial key server, the devices can use the first sacrificial return key to decrypt an encrypted key file of the quantum production key package, that has the plurality of quantum production keys nested in encrypted key files within its different levels. With the quantum production key, the devices 102A-102B can use it to encrypt/decrypt data 672A,672B to communicate with each other or other devices of a plurality of devices that receive the production key packages.

Key Package Distribution Methods

FIG. 1A illustrate quantum key packages being distributed to users. The quantum key packages being distributed to users in different ways. Soft copies of the quantum key packages can be encrypted and sent in IP packets electronically over the internet to the users. Alternatively, the initial delivery/distribution of the quantum key packages can be performed in a more secure manner. The quantum key packages can be initially be delivered physically.

Figure 7A:
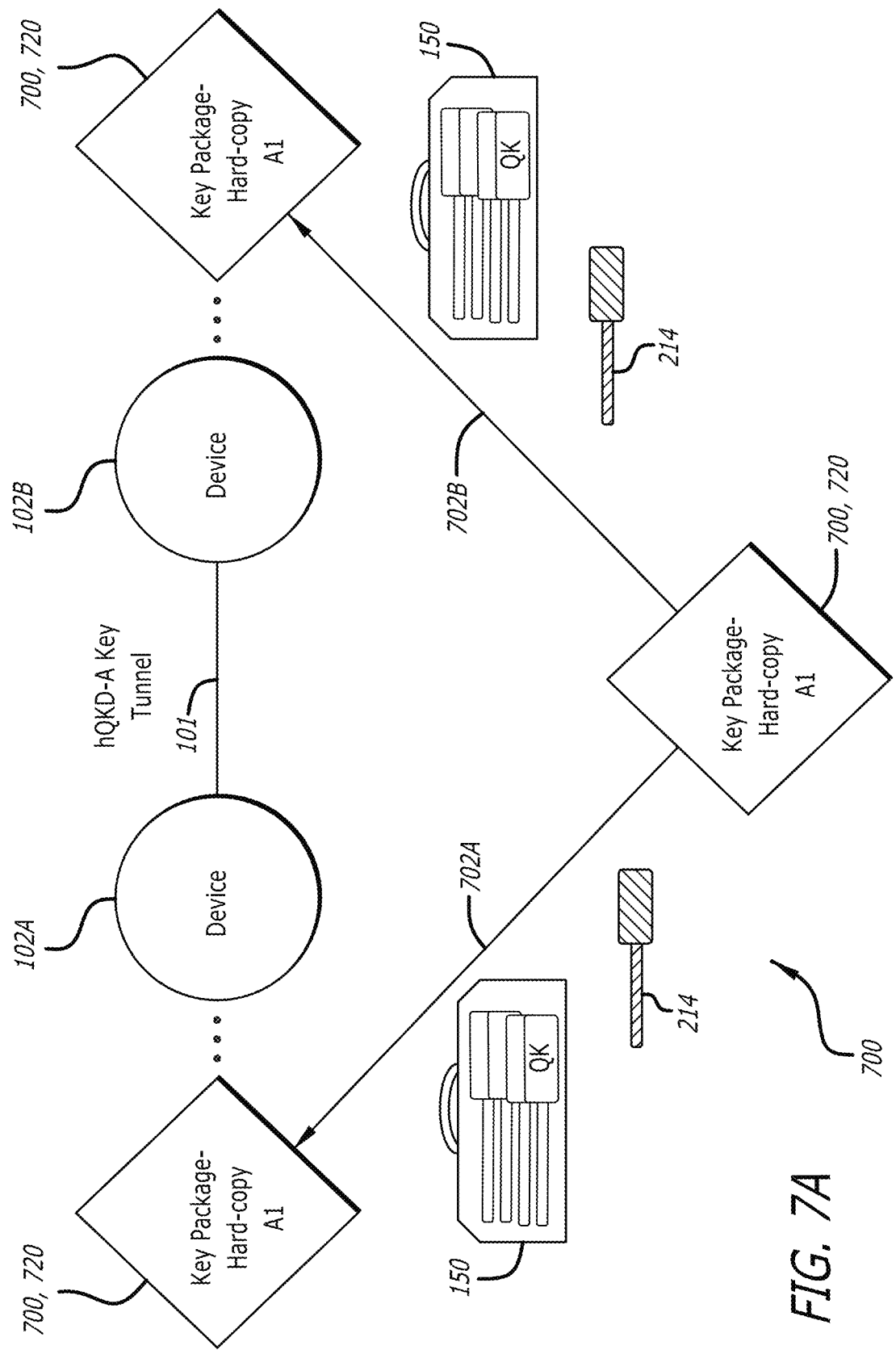
FIG. 7A is a block diagram illustrating physical distribution of a quantum production key package.

FIG. 7A illustrates a block diagram of a physical distribution (out of network) of an encrypted production key package 150 and a sacrificial return key 214 to users that can be used to decrypt the encrypted production key package 150. With physical delivery of the encrypted production key package 150 and the sacrificial return key 214, a key server need not be used to set up a secure tunnel between users. A physical distribution of a production key package to user devices can avoid public disclosure over a wide area network (e.g., the internet) or a local area network, including any wired network and/or a wireless network portions.

In one embodiment, the production key package 150 with an encrypted key file of a plurality of quantum cypher keys can be transferred in a hardcopy format 700 so that there is no public exposure. The plurality of quantum cypher keys can be simply printed line by line on one or more pages using ASCII characters or alternatively encoded as a QR code. In another embodiment, a package with an encrypted key file of a plurality of quantum cypher keys can be transferred in a softcopy format 720 on a physical drive so that there is no public exposure.

The package with the encrypted key file is replicated for the number of users that are to being established to a quantum tunnel together within a cypher network. The hard copy or soft copy of the package with the encrypted key file is physically delivered 702A-702B to each user device 102A-102B in the cypher network. The physically delivery can be by government postal mail, private shippers, or a combination of both. When received, the package with the encrypted key file can then be loaded onto each user device, decrypted with a sacrificial return key to obtain a first cypher production key to establish a quantum key tunnel 101 between devices in the cypher network.

Figure 7D:
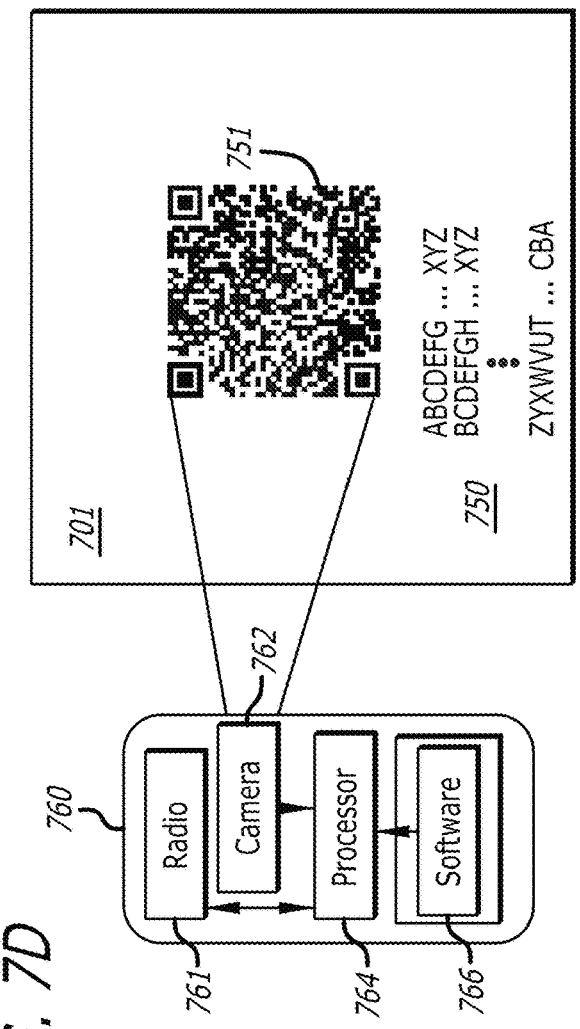
FIG. 7D is a diagram illustrating an encoded physical distribution of a quantum production key package by a printed code, such as a quick response (QR) code.
Figure 7C:
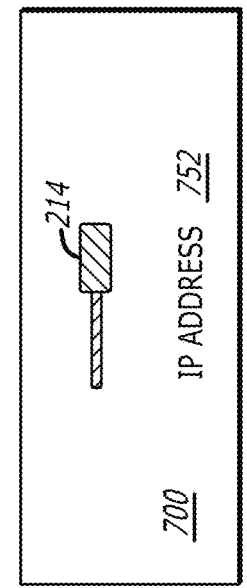
FIG. 7C is a diagram illustrating physical distribution of a quantum cypher key and network address by a hardcopy printout physically shipped in an envelope to a user at a mailing address.
Figure 7B:
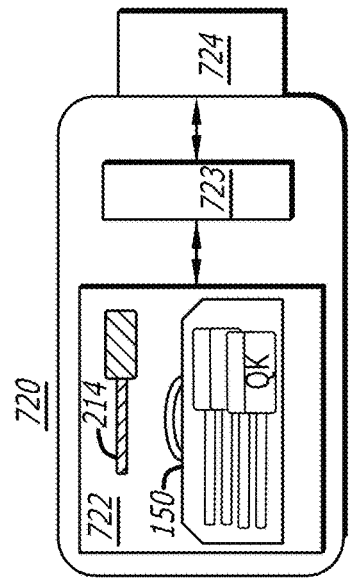
FIG. 7B is a diagram illustrating physical distribution of a quantum production key package by means of a solid state drive.

Referring now to FIG. 7B, one or more portable storage devices 720 can be used to physically deliver a production key package of symmetric quantum cipher keys to one or more client computer devices. The portable storage device 720 can include a storage device (e.g., flash memory, solid state drive, hard drive) 722, a connector 724, and a controller 723 coupled to and between the storage device 722 and the connector 724. As is shown, the portable storage device 720 further includes a housing into which the storage device, the controller, and a portion of the connector are mounted. A portable storage device 720 can also be used to physically deliver a sacrificial key package of symmetric quantum cipher keys to a sever.

The storage device 722 can be a solid state storage device (SSD) such as flash memory device or electrically erasable programmable read only memory (EEPROM) to store data. The controller 723 can be a flash memory controller to control the flow of data between the storage device 722 and the computer device to which the portable storage device 720 is connected. Accordingly, the connector 724 is a physical electrical connector. The connector 724 can be a universal serial bus (USB) connector to plug into and out of a USB port of a computer device such that the portable storage device 720 is a USB storage device.

A production key package 150 with a plurality of symmetric quantum cipher keys is stored into the storage device 722. A plurality of portable storage devices 720 with the same set of symmetric quantum cipher keys can be physically shipped to users. The connector 724 of portable storage devices 720 can be plugged into a port of a computer client device for installation of the production key package 150 with the plurality of symmetric quantum cipher keys into the computer client device. The production key package 150 is itself encrypted and needs to be decrypted by a sacrificial return key 214 to gain access to the plurality of symmetric quantum cipher keys. In one embodiment, the file name (name tag) of the production key package 150 can be used as the initial sacrificial return key. In another embodiment, a separate sacrificial return key can be stored in the storage device 722. In another embodiment, a separate sacrificial return key 214 can be physically sent to the user by a different means, such as on paper 700 shown in FIG. 7C. Separate delivery of the sacrificial return key from the production key package 150, as well as by a different physical delivery method, can provide added security.

Referring now to FIG. 7D, a plurality of quantum cypher keys 750 can be transferred in a hardcopy format 701 so that there is no public exposure. For example, a one hundred-twenty-eight (128) bit Advanced Encryption Standard (AES) encryption key of sixteen eight-bit (8-bit) bytes is equal to sixteen (16) printable ASCII characters coded with 8-bit bytes. Similarly, a 256 bit AES encryption key is equal to thirty-two (32) printable ASCII characters coded with 8-bit bytes. Similarly, a 512 bit AES encryption key is equal to sixty-four (64) printable ASCII characters coded with 8-bit bytes. Similarly, a 1024 bit AES encryption key is equal to one hundred twenty eight (128) printable ASCII characters coded with 8-bit bytes.

In an alternate embodiment, a hardcopy print 700 of an initial hardcopy sacrificial send key 214 and network address (IP address, URL-domain name) 752 can be physically sent by postal mail to a plurality of users that are to be in a cipher network. The initial hardcopy sacrificial send key 214 can be sent to the network address to begin the process of setting up a quantum cypher tunnel to obtain access to a production key package over the quantum cypher tunnel.

In an alternate embodiment, the production key package 150 and/or sacrificial send key 214 can be sent in hardcopy form as an encoded print out 751, such as a quick response (QR) code for example that can be scanned by a camera coupled to a computer or a camera 762 of a smart phone 760 to read. The smart phone 760 includes a wireless communication network radio (e.g., cell phone radio, WIFI radio) 761, the camera 762, and a storage device 766 coupled to a processor 764. Software instructions of a cypher software application stored in the storage device 766 of the smart phone can be executed by the processor 764 to capture an image of the sacrificial send key 751. The software instructions of the cypher software application can further read the encoded print out and make a connection to a server at a first network address, such as an access server. If the encoded printout 751 is just an initial hardcopy sacrificial send key, an encrypted production key package can be downloaded first and a sacrificial return key second to decrypt the encrypted production key package. If the encoded printout 751 is an initial hardcopy sacrificial send key and an encrypted production key package 150, the sacrificial send key can be sent so that a sacrificial return key can be downloaded to decrypt the encrypted production key package.

The file name of the downloaded encrypted production key package can be read by the cypher software application. The file name itself can act as a sacrificial send key. The cypher software application can send the file name from the smart phone to a sacrificial key server at a predetermined network address. In response to the sacrificial send key, the sacrificial key server can return back to the sending device a sacrificial return key, that can be used to decrypt the encrypted production key package. With the decrypted production key package, access to another sacrificial send key within the production key package can be used to obtain another sacrificial return key. This sacrificial return key can be used to decrypt an encrypted file within the production key package to access a first level of the nested quantum cipher keys and yet another sacrificial send key for the next level.

The smartphone 760 can establish a wireless communication connection to a communication network using the radio 761. With a quantum cypher key from the production key package, the cypher software application can include instructions to form a quantum key secured tunnel (a form of virtual private network) with other users using the wireless communication connection. Through the quantum key secured tunnel provided by the cypher software application, information (data and text) is encrypted by the software before being sent from the smart phone 760 to another user in a cypher network of users over the communication network. Information received through the quantum key secured tunnel over the communication network, can be decrypted by the software when received by the smart phone 760 from another user in the cypher network.

Hybrid Quantum Key Distribution

Figure 8:
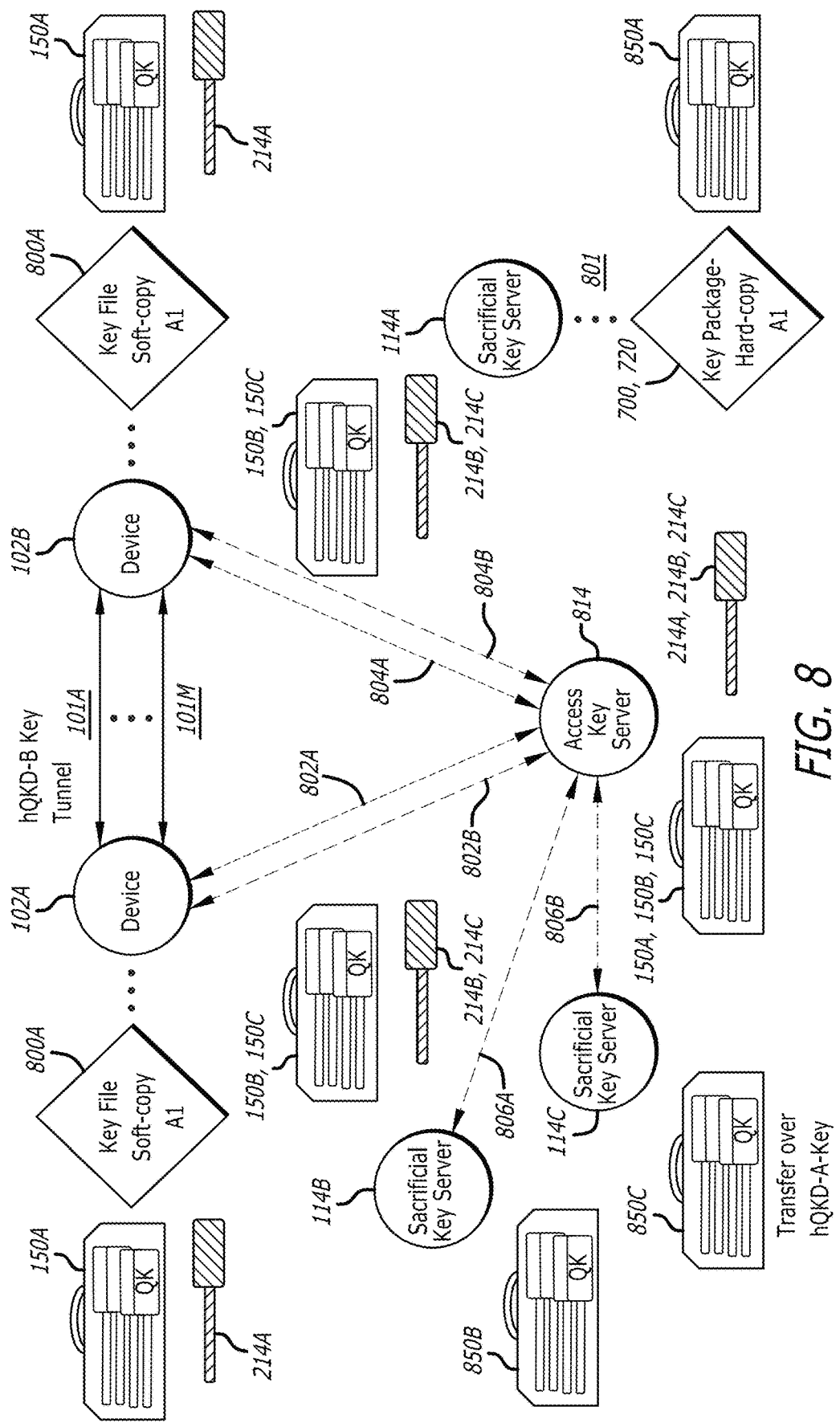
FIG. 8 is a block diagram illustrating a hybrid distribution of quantum production key packages by a physical delivery and an electronic soft copy distribution over quantum tunnels.

There are various security methods that can be used for electronic delivery of a quantum production key package over communication networks to users. Referring now to FIG. 8, the quantum key production package can also be delivered in a hybrid manner with a portion of the delivery being made by a physical (out of network) delivery, and another portion of the delivery or later deliveries, being made electronically (in network) over the communication networks to users and their devices. Using the physical delivery of production keys, a quantum tunnel can be formed with a key server so that subsequent electronic delivery of an encrypted key package is protected from interception. A second quantum tunnel can be formed with the key server by using a key delivered over the first quantum tunnel. The second quantum tunnel can then be used to electronically deliver an encrypted key package.

hQKD-B. Public Encrypted Transfer of Encrypted Key File Via hQKD-A Key

Initially, a physical transfer (or out of network) of an encrypted cypher key package 150A and sacrificial send key 214A can be made to the devices 102A-102B by soft copy 800A-800B or by hard copy as described with reference to FIGS. 7A-7D. Similarly, a physical transfer (or out of network transfer) 801 of a sacrificial key package 850A, 850B,850C to the sacrificial key server 114A,144B,114C by soft copy or by hard copy is performed as described with reference to FIGS. 7A-7D. With the encrypted cypher key package 150A and sacrificial send key 214A, a quantum tunnel 101 can be formed between user devices 102A-102B. Based on the physical delivery, a first quantum tunnel 802A,804A can also be formed between the user devices 102A-102B and an access key server 814. When the user devices 102A-120B need additional keys, they can request and receive soft copies of a new encrypted cypher key package 150B and a sacrificial send key 214B over the first quantum tunnel 802A,804A. A first quantum tunnel 806A can also be formed between the access key server 814 and the sacrificial key server 114B to deliver a new encrypted sacrificial key package 850B associated with the new encrypted cypher key package 150B and sacrificial send key 214B.

Because the first quantum tunnel 802A,802B is formed based on the physically delivered encrypted cypher key package 150A and sacrificial send key 214A, the security provided by the first quantum tunnel 802A,804A should be very good. Accordingly, the delivery of the soft copies of the new encrypted cypher key package 150B and the sacrificial send key 214B over the quantum based cypher computer network tunnel 802A,804A should be at a high security level.

The file name of the production key package can be used as an initial sacrificial send key 214A,214B,214C that is sent to the sacrificial key server 114A,114B,114C (sometimes collectively referred to herein as sacrificial key server 114). The initial sacrificial send key 214A,214B,214C allows the sacrificial key package 850A,850B,850C to be opened and a sacrificial return key to be retrieved and sent back to the user devices. The sacrificial return key is used by the user devices to decrypt the encrypted production package 150A, 150B,150C and gain access to another sacrificial send key. This next sacrificial send key can be sent to the key server 114 for yet another sacrificial return key to decrypt a production key in the encrypted production package 150A, 150B,150C.

After the new production key package 150B and the sacrificial send key 214B are delivered to the user devices, the tunnels 802A,804A, based on the physical shipment, can be dropped between the access key server 814 and the user devices 102A-102B.

hQKD-C, Public Encrypted Transfer of Encrypted Key File Via hQKD-B Key

When quantum cypher keys in a second production key package run low, a third set of tunnels 802B,804B can be set up between the access key server 814 and the user devices 102A-102B based on the second production key package 150B and key 214B that were sent over the first set of tunnels 802A,804A. Over the second set of tunnels 802B, 804B another new soft copy of a production key package 150C and a sacrificial send key 214C can be requested. The access key server 814 can send softcopies of the new encrypted production key package 150C and the sacrificial send key 214C over the second quantum tunnel 802B,804B. A second tunnel 806B can also be formed between the access key server 814 and the sacrificial key server 114C. Over the second tunnel 806B, the access key server 814 can also send a softcopy of the sacrificial key package 850C to the sacrificial key server 114 that is associated with the production key package 150C and the sacrificial send key 214C.

Because the second quantum tunnel 802B,804B is formed based on the electronically delivered encrypted cypher key package 150B and sacrificial send key 214B, the security provided by the second quantum tunnel 802B,804B is lower than that of the first but still secure. Accordingly, even though the soft copies of the new encrypted cypher key package 150C and the sacrificial send key 214C are delivered over less secure quantum based cypher computer network tunnel 802B,804B, it should provide a sufficient level of security.

hQKD-D, Public Transfer of Encrypted Key File Via PKI Encryption

The quantum production key package can be encrypted by different encryption (cypher) algorithms prior to electronic delivery. It was assumed previously that symmetric AES would use a production cypher key to set up a quantum tunnel. However, a different cypher algorithm with different types of keys can be used to set up the quantum tunnel. In accordance with another embodiment, a public key infrastructure (PKI) algorithm, an asymmetric algorithm, can be used with a public key to encrypt and a private key to decrypt and secure the initial transfer of a production key package to user devices and a sacrificial key package to a server.

Key Package Generation

Figure 9:
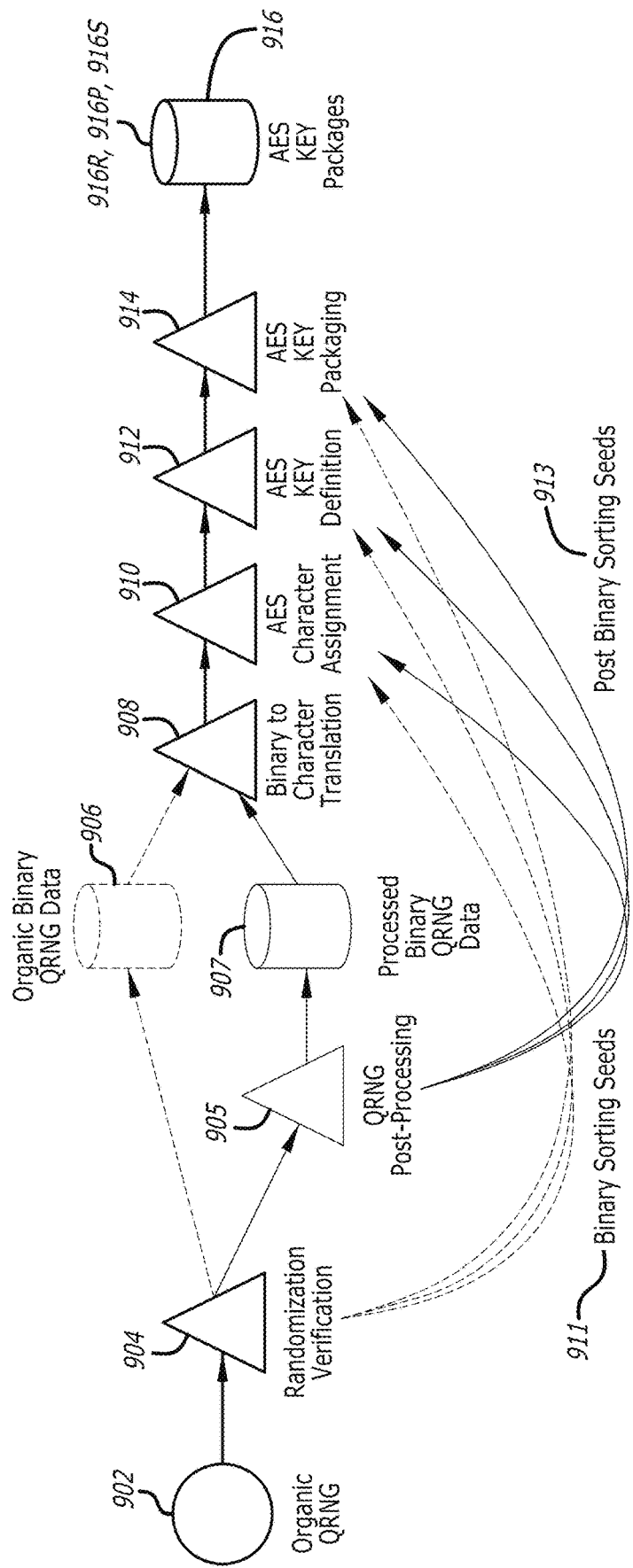
FIG. 9 illustrates a method of generation of sacrificial send keys, sacrificial return keys, and production cipher keys using a quantum random number generator.

FIG. 9 illustrates a method of generating sacrificial and production cipher keys using a quantum random number generator. A plurality of quantum cypher keys generated by this method can be used for the production key packages and a sacrificial key package.

At process 902, organic quantum random bits are generated by a quantum random number generator (QRNG). The QRNG generates a random bits based on true entropy which avoids generating patterns in a series of bits. Patterns can often be discerned with software, transistor circuit, or mechanical random number generation methods used to form random numbers. The QRNG is a photon based random number generator. In an alternative embodiment, QRNG can be a bosun based random number generator. In the case of photons, the QRNG can include a semiconductor light source, such as a light-emitting diode (LED) or laser diode, that generates the photons when powered up and one or more image sensors or photodetectors that captures the photons emitted by the semiconductor light source. Due to quantum noise, the semiconductor light source emits a random number of photons, which are captured and instantly counted by the image sensor. The instant count of the image sensor over time provides a random sequence of bits (raw random numbers). In another case, a single photon can be generated that randomly passes through an optical device (e.g., dichroic filter, mirror or beam splitter) to a photodetector or is reflected by the optical device to a photodetector. The state of superposition at the mirror provides the randomness. The data read by either photodetector over time provides a random sequence of bits (raw random numbers).

The quantum random number generator can be embedded into an electronic device or server such as by using a Quantis QRNG integrated circuit chip by ID Quantique SA. Alternatively, the quantum random number generator can on a printed circuit board (PCB) card and plugged into a socket of a motherboard of a computer. The PCB card can be a Quantis QRNG PCIe-40M or a Quantis QRNG PCIe-240M by ID Quantique SA for example. Alternatively, the quantum random number generator can be stand-alone network appliance that is coupled to a key server computer. The stand-alone QRNG network applicant network appliance can be a Quantis Appliance 2.0 by ID Quantique SA, that is then coupled to a server.

It is nearly statistically impossible to guess a quantum generated random number. This is because of physics of quantum state of a photon, electron, or boson. We are unable to measure the states of a photon simultaneously without perturbing it. For example, it is impossible to measure both a position and a momentum of a particle at the same time because measuring one disturbs the other. Accordingly, the generation of photons by a light source and the measurement of them by an image sensor can provide an organic random number, a quantum random number.

At process 904, a verification of the randomization of the quantum random number can be performed. One or more statistical tests can be performed on the series of random numbers being generated to test for randomness. Some of these statistical tests have been standardized by the National Institute of Standards and Technology (NIST) and described in NIST Special Publication No. 800-22, Revision 1A, titled A STATISTICAL TEST SUITE FOR RANDOM AND PSEUDORANDOM NUMBER GENERATORS FOR CRYPTOGRAPHIC APPLICATIONS by Andrew Rukhin et al. dated April 2010. Other random number test suites can be used for verification, such as DIEHARDER: A RANDOM NUMBER TEST SUITE by Robert G. Brown et al of Duke University Physics Department or the DIEHARD BATTERY OF TESTS by George Marsaglia of the University of Florida.

Alternatively, a filter can be used. In any case, the verification assures that the QRNG is properly operating in the generation of random numbers. Assuming the randomization is verified, the process can go to process 905,906. The raw quantum random numbers from the image sensor can be used as an input (seed values) into a random bit generator and some additional processing can be performed in parallel to generate slightly different seed values with further randomization for a random bit generator.

At process 906, the randomized bits after the verification process are temporality stored/buffered in a storage device, such as a memory or storage drive. The stored binary data of random numbers can then be encoded M bits (e.g., 8 bit bytes) at a time into ASCII characters.

At process 905, for further randomization, quantum random number generator post processing can be performed. The random binary bits representing random numbers are coupled into another random number bit generator, such as a deterministic random bit generator (DRBG) algorithm that distills the entropy of quantum origin to produce further randomization in the bits. Based on the post processed quantum random numbers, the deterministic random bit generator (DRBG) generate post processed binary data therefrom. The post processed binary data can then be encoded into ASCII characters.

At process 907, the further randomized bits are temporality stored/buffered in a storage device, such as a memory or storage drive. The stored binary data of random numbers can then be encoded m bits at a time (e.g., 8 bit bytes) into characters. At process 908, a binary to character translation can be performed on one or the other of the binary bits stored in either storage device. If more randomization is desired, the double randomization by processes 905,907 can be selected. If lower costs or less processing time is desired, the extra randomization provided by the post processing 905 can be skipped. In one embodiment, the binary to character translation is a binary to ASCII character set translation of 8 bit bytes. The character translation can be performed in series as the bits are generated and stored in the storage device. However, it may be desirable to randomize the characters as well.

At process 910, an AES character assignment can be performed where the order of character assignment is made random. Instead of a series or temporal sequence of characters, the character assignment randomizes the order to further randomize the series of characters.

At process 912, the key definition (type and length) is used to read N random series of characters as a set for a key. The set of key types is a sacrificial send/return key, a production (cypher) key, or a nomenclature (file name) key. A key is a predetermined number N characters wide or long. For example, N can be 8, 16, 24, 32, 64, 128, 256, 512, 1024, or N characters wide for a key. Usually, the larger the cypher key length, the more secure the data will be when encrypted with the cypher key. Typically, a production key is 64 or more characters wide or long. A sacrificial key and a nomenclature key can have the same length as a production key or shorter lengths. A sacrificial key can have a smaller key length. A nomenclature key can also have a shorter key length as well. It is possible to randomly vary the key length over a range (e.g., from 128 to 1024) from key to key in a predetermined manner for a key package to provide further security.

When transmitted, a sacrificial send key, a sacrificial return key, and a nomenclature key can be unencrypted because they are temporarily used and are not used to encrypt/decrypt data. However, at levels below a current level in a folder directory, sacrificial send keys can be encrypted with production keys in a file folder as an encrypted file. The production key packages and the quantum production cypher keys can be encrypted to keep the cypher keys secure until ready to be used. Sacrificial send keys can be encrypted at various levels of the key packages with the production keys with one sacrificial send key unencrypted to gain access to the next encrypted production key and sacrificial send key.

At process 914, after the characters to a key are assigned and the key definition is used to select a set of characters for a key, a predetermined number X of a plurality of keys can be grouped together as a set of production keys 916P for a production key package, and a plurality of Y keys can be grouped together as a set of sacrificial send keys 916S for the production key package, and a plurality of Z keys can be grouped together as a set of sacrificial return keys 916R for a sacrificial key package. Accordingly, a quantum cypher key can be a sacrificial send key type, a sacrificial return key type, a production key type, or a nomenclature key type. The nomenclature key can be generated initially for determining the file names for the production key package and the sacrificial key package that are paired together with a matching character portion. The X plurality of production keys for a production package can be subsequently nested or cascaded together and encrypted at levels with an unencrypted sacrificial send key. That is, in the case of a production key package, an unencrypted sacrificial send key can be cascaded with an encrypted production key file at levels in the package.

At process 916, sets of production keys 916P, sets of sacrificial send (send and return) keys 916S, and sets of sacrificial return keys 916R can be stored in a secured storage device. A plurality of quantum random file names, but for a matching portion, can be similarly stored in a secured storage device awaiting further processing for packaging and distribution of the key packages. The generation of the quantum random file names (nomenclature) for the packages is slightly different and discussed with reference to FIG. 10A.

Process 911 or process 913 are optional steps that can be taken to even further randomize the generation of cypher keys. At process 911, after the verification process, random numbers can be used as binary sorting seeds (using AND, OR, or IF-THEN logic) to randomize the AES character assignment process 910.

Figure 10A:
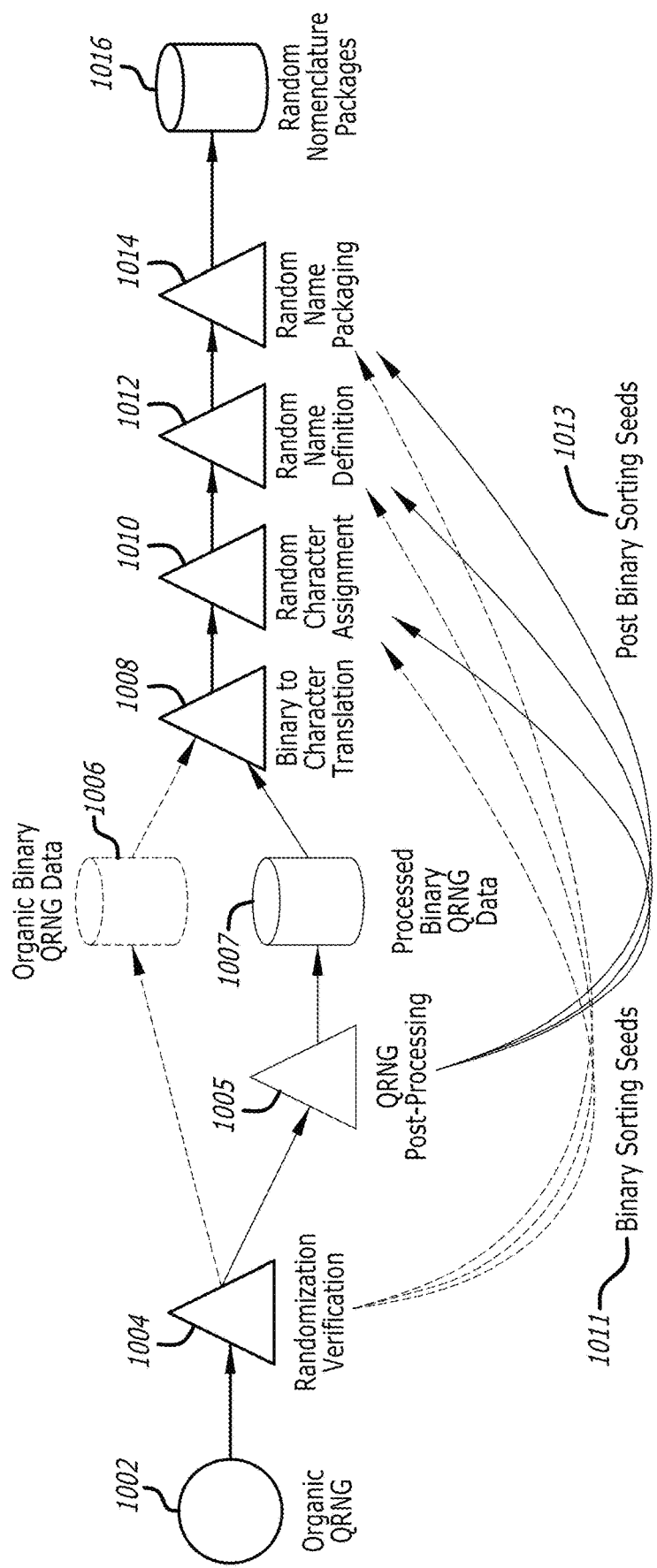
FIG. 10A illustrates a method of forming a pair of random file names with a matching character portion using a quantum random number generator.

Referring now to FIG. 10A, a method of forming random file names for key packages using a quantum random number generator is shown. Processes 1002-1010 for randomly generating random filenames can be similar to the processes 902-910 for generating cypher keys. A pair of random filenames for a production key package and a sacrificial key package are typically generated before the production and sacrificial key packages. A portion of the random characters in the same position in the pair of random file names are merged together to show relatedness or association between the pair of file names. This is so the pair of filenames identify the sacrificial key package and the production key package with proper quantum cypher keys that can be subsequently used together by a plurality of users. Additionally, the filenames of one key package can be used for a top level of encryption/decryption of the other key package.

At process 1002, organic quantum random bits are generated by a quantum random number generator (QRNG). The QRNG generates a random bits based on true entropy which avoids generating patterns in a series of bits. This process is similar to process 902.

At process 1004, a verification of the randomization of the quantum random number can be performed. One or more statistical tests can be performed on the series of random numbers being generated to test for randomness. This process is similar to process 904.

At process 1006, the randomized bits after the verification process are temporality stored/buffered in a storage device, such as a memory or storage drive. The stored binary data of random numbers can then be encoded M bits (e.g., 8 bit bytes) at a time into ASCII characters.

At process 1005, for further randomization, quantum random number generator post processing can be performed. The random binary bits representing random numbers are coupled into another random number bit generator, such as a deterministic random bit generator (DRBG) algorithm that distills the entropy of quantum origin to produce further randomization in the bits. Based on the post processed quantum random numbers, the deterministic random bit generator (DRBG) generate post processed binary data therefrom. The post processed binary data can then be encoded into ASCII characters.

At process 1007, the further randomized bits are temporality stored/buffered in a storage device, such as a memory or storage drive. The stored binary data of random numbers can then be encoded m bits at a time (e.g., 8 bit bytes) into characters. This process is similar to process 907.

At process 1008, a binary to character translation can be performed on one or the other of the binary bits stored in either storage device. If more randomization is desired, the double randomization by processes 1005,1007 can be selected. If lower costs or less processing time is desired, the extra randomization provided by the post processing 1005 can be skipped. This process is similar to process 908. In one embodiment, the binary to character translation is a binary to ASCII character set translation of 8 bit bytes. The character translation can be performed in series as the bits are generated and stored in the storage device. However, it may be desirable to randomize the characters as well.

At process 1010, an AES character assignment can be performed where the order of character assignment is made random. Instead of a series or temporal sequence of characters, the character assignment randomizes the order to further randomize the series of characters. This process is similar to process 910.

At process 1012, the naming convention/definition is used to form the length of the random file name. The naming convention/definition can also detail the number and specific characters positions in the file name that are to be a predetermined matching portion and used to associate the pair of filenames for the production key package and the sacrificial key package. As shown by FIG. 10F, examples of a random production key package filename 1030P and a random sacrificial key package filename 1031S are shown.

The random filenames can have different lengths and will have different characters generated by a random number generator. All of the characters are quantum random characters including portions designated by YYYYYYYY; XXXXXXX, xxxxxxxxxx, yyyyyyyyyyyy, PackageDifferent, and SacrificialPackF. Overall, the random production key package filename 1030P differs from the random sacrificial key package filename 1031S.

At process 1014, after random characters are assigned to a pair of file names of a predetermined length, the predetermined matching character portion can be formed in each of the paired of random character file names.

The selection of random character assignment, random name definition and random packaging can optionally be randomized by binary sorting seeds or post binary sorting seeds similar to processes 911 and 913 shown in FIG. 9. Process 1011 and process 1013 are optional steps that can be taken to even further randomize the generation of cypher keys. At process 1011, after the verification process, random numbers can be used as binary sorting seeds (using AND, OR, or IF-THEN logic) to randomize the random character assignment process 1010, the random name definition process 1012, and/or the random name packaging process 1014. At process 1013, after the QRNG post-processing 1005, random numbers can be used as post binary sorting seeds (using AND, OR, or IF-THEN logic) to randomize the random character assignment process 1010, the random name definition process 1012, and/or the random name packaging process 1014.

A portion of the random characters in the same position in the pair of random file names are merged together (e.g., alternating characters in each file name override the other, one set is used to override the other) to form a matching portion of random characters in each file name. A predetermined algorithm can also be used to further deter use of the matching random characters in each file name for the production key package and the sacrificial key package. Depending upon the position of the matching characters in the file name (e.g., first X characters, last Y characters, Z characters offset by W characters from the beginning), the lengths of the file names for the production key package and the sacrificial key package can differ.

Referring now to FIGS. 10B-10E, examples of a plurality of pairs of associated production key package filenames 1021P-1024P and sacrificial key package filenames 1026S-1029S is shown. The filenames 1021P-1024P include a matching character portion (e.g., SameNameSameName, SameNameSameNamF) to that of the filenames 1026S-1029S amongst quantum random character portions (e.g., xxxxxxxxxx, YYYYYYYY; XXXXXXX, YYYYYY; xxxxxxxxxx, yyyyyyyyyyyy). The number and specific characters positions in the file name that are to be a matching character portion (e.g., SameNameSameName, SameNameSameNamF) is predetermined. The matching character portion is used to associate the pair of filenames for the production key package and the sacrificial key package.

Example filenames are only shown in FIGS. 10B-10F. The upper case and lower case letters "x" "y" shown are placeholders representing quantum random variable characters in character position of the filename. Furthermore, the random filenames can have different lengths and will have different characters generated by a random number generator.

As shown by FIG. 10F, a random production key package filename 1030P initially differs from a random sacrificial key package filename 1031S. A portion of the random characters in the same position in the pair of random file names can be merged together (e.g., alternating characters in each file name override the other, or one set can be used to override the other) to form a matching portion of random characters in each file name. For example, the "S" character in "SacrificialPackF" can be selected as the first character of the matching portion. The "a" character in "PackageDifferent" of the production key package file name 1030P can be selected as the second character of the matching portion. This can continue on for a total of X characters resulting in a matching portion "SameNameSameName" in filenames 1021P-1023P and in filenames 1026S-1028S shown in FIGS. 10B-10D.

Provided the position of the matching character portion is predetermined and well defined in each file name, the position of the matching character portion can differ. The matching portion "SameNameSameName" in filenames can be located at the beginning of the filenames 1021P,1026S as shown in FIG. 10B. The matching portion "SameNameSameName" in filenames can be located at the end of the filenames 1022P, 1027S as shown in FIG. 10C. Alternatively, the matching portion in filenames can be located E characters from the end or B characters from the beginning of the filenames. For example, the matching portion "SameNameSameName" is located between the beginning and ending of the filenames 1023P,1028S as shown in FIG. 10D.

Further, if the position of the matching character portion is predetermined and well defined, the length of the production key package filename can differ from the length of the sacrificial key package file name. In FIG. 10B, the production key package filename 1021P has the same character length as the sacrificial key package filename 1026S. Depending upon the position of the matching character portion in the file name (e.g., first X characters, last Y characters, Z characters offset by W characters from the beginning), the lengths of the file names for the production key package and the sacrificial key package can differ. In FIG. 10C, the matching character portion is well defined to be the last 16 characters in each filename, for example.

Accordingly, the length of the production key package filename 1022P can differ from the length of the sacrificial key package file name 1027S. Continuing with the example, the filename 1022P is 32 characters in length while the filename 1027S is 24 characters in length and differs from that of the filename 1022P.

Referring now to FIG. 10E, to further deter usage of the matching portion by unauthorized users (e.g., hackers), a predetermined encoding algorithm can also be used to scramble one or more of the matching characters in the matching portion in each of the file name pair. For example, in FIG. 10E, the matching portion "SameNameSameNamF" in the filenames 1024P, 1029D has a last character 1025P, 1025S altered to "F" from the character "e" in "SameName-SameName". The predetermined encoding algorithm knows of this alteration/encoding and can be used to decode into the proper matching portion. This is so the proper filename of one package (e.g., the production key package) can be used as an initial sacrificial key to decrypt the other key package (e.g., the sacrificial key package).

Referring now back to FIG. 10A, at process 1016, the paired production key package filename and sacrificial key package filename, with the matching character portion, can be stored in a secured storage device.

Figure 11:
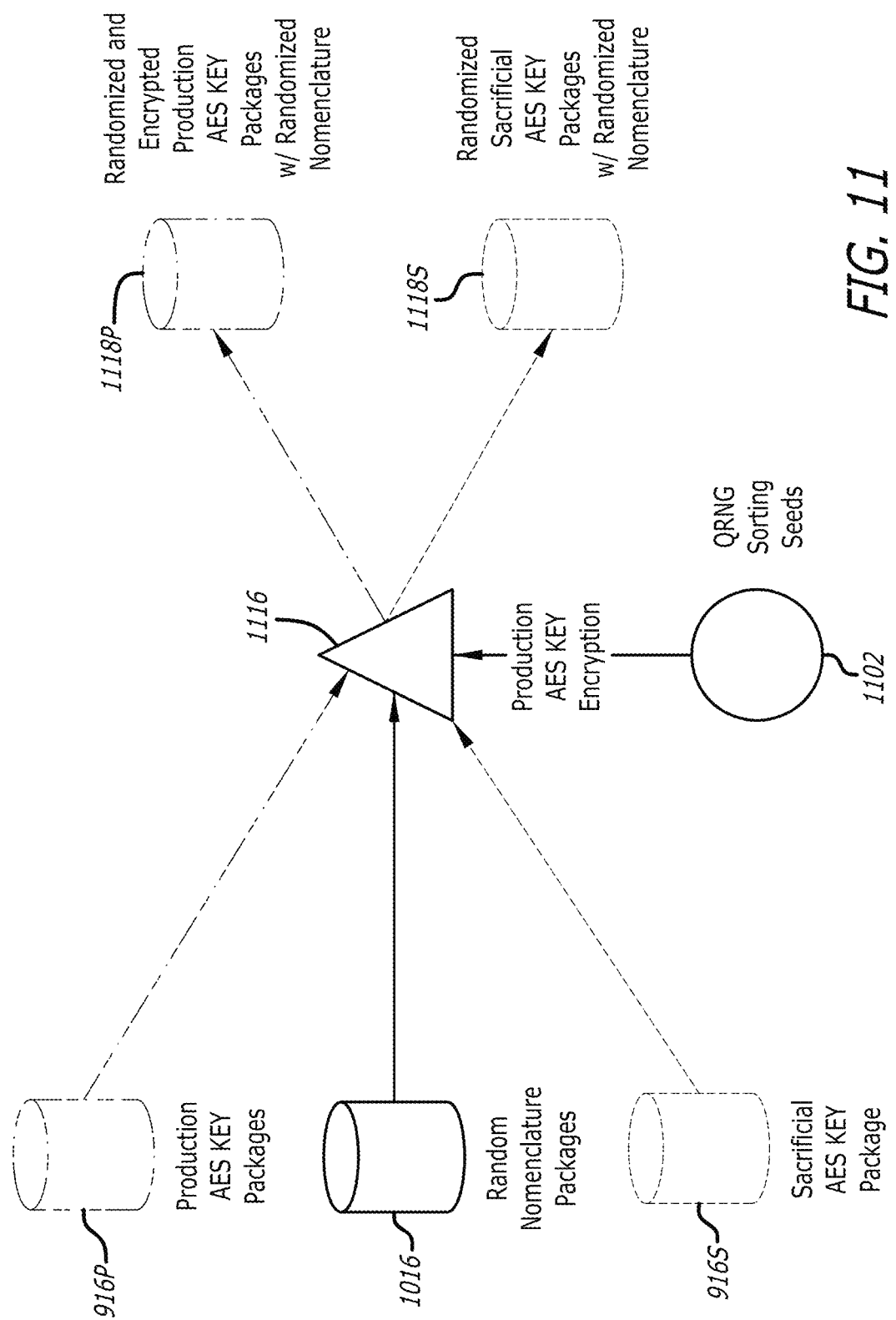
FIG. 11 illustrates a block diagram of a method of forming encrypted production key packages and encrypted sacrificial key packages using the paired random file names and quantum cipher keys generated using a quantum random number generator such as shown by FIGS. 9 and 10A.

Referring now to FIG. 11, a block diagram is illustrated of a method of generating an encrypted production key package 1118P and an encrypted sacrificial key package 1118S. Sets of a plurality of production keys, sets of a plurality of sacrificial keys (send and return), and pairs of paired sacrificial key package and production key package file names are stored in storage devices. Production keys are retrieved from the storage device 916P. Sacrificial keys are retrieved from the storage device 916S. Paired sacrificial key package and production key package file names, with a matching character portion, are retrieved from the storage device 1016. The type of packaging, the number of production keys in a production key package, and the number of sacrificial keys in a sacrificial key package are predetermined to gain an understanding of the number of cascaded levels in the key packages.

At process 1116, a paired sacrificial key package filename and production key package file name are selected from the storage device 1016 for assignment to key packages.

Sacrificial return keys are selected from the storage device 916S for encrypting production keys from the storage device 916P, with or without sacrificial send keys and sacrificial key server network addresses, into encrypted files at each level. The encryption of files starts at the lowest level of the key package and cascades upward through the levels of a package until reaching a top level. At a top level of the production key package, the production key package itself is encrypted with a last (top level) sacrificial return key that is to be stored in the sacrificial key package at a top level. Upon receipt of the top level sacrificial return key, a user device can decrypt an encrypted production key package. The encrypted production key package is saved with the selected production key package filename into the storage device 1118P ready for distribution to user devices.

The selected sacrificial return keys can be similarly encrypted by sacrificial send keys selected from the storage device 916S into encrypted files at each level, starting at the lowest level cascading upward through the levels of a sacrificial key package until reaching a top level. At a top level, the sacrificial key package itself is encrypted with the selected production key package file name. Upon receipt of the production key package filename, the sacrificial key server can decrypt the encrypted sacrificial key package and gain access to the top level sacrificial return key that can be sent back to a requesting user device. The encrypted sacrificial key package is saved with the selected sacrificial key package filename in the storage device 1118S ready for distribution to the sacrificial key server.

The selection of stored keys for use at each level of encryption can optionally be randomized by sorting seeds. At process 1102, a quantum random number generator provides a sorting seed to select keys out of the stored key sets in the storage devices 916P,916S that are respectively used for formation of the production key package and the sacrificial key package instead of using a linear process of selection. Sorting seeds can also be used to randomly select the paired sacrificial key package filename and production key package file name are selected from the storage device 1016.

Computer System

Referring now to FIG. 12, a block diagram of a computing system 1200 is shown that can execute the software instructions for the generation, packaging, and distribution of quantum keys for encrypting and decrypting data/text in order to form secure communication channels (quantum tunnels) between user devices. The computing system 1200 can be an instance of a production server executing stored software instructions to perform the functional processes described herein of a production key server with a quantum random number generator generating quantum keys and random file names to generate production key packages and sacrificial key packages. The computing system 1200 can also be an instance of an access key server, and/or a sacrificial key server executing stored software instructions to perform the functional processes described herein of an access key server, and/or a sacrificial key server. The computing system 1200 can also be an instance of a plurality of instances of client devices in a wide area network. In which case, the computing system 1200 can execute instructions of virtual private network software with a predetermined symmetric cypher algorithm and use the symmetric quantum keys in the production key packages described herein to form quantum tunnels with other computer systems 1200 between users.

In one embodiment, the computing system 1200 can include a computer 1201 coupled in communication with a graphics monitor 1202 with or without a microphone. The computer 1201 can further be coupled to a loudspeaker 1290, a microphone 1291, and a camera 1292 in a service area with audio video devices. In accordance with one embodiment, the computer 1201 can include one or more processors 1210, memory 1220; one or more storage drives (e.g., solid state drive, hard disk drive) 1230,1240; a video input/output interface 1250A; a video input interface 1250B; a parallel/serial input/output data interface 1260; a plurality of network interfaces 1261A-1261N; a plurality of radio transmitter/receivers (transceivers) 1262A-1262N; and an audio interface 1270. The graphics monitor 1202 can be coupled in communication with the video input/output interface 1250A. The camera 1292 can be coupled in communication with the video input interface 1250B. The speaker 1290 and microphone 1291 can be coupled in communication with the audio interface 1270. The camera 1292 can be used to view one or more audio-visual devices in a service area, such as the monitor 1202. The loudspeaker 1290 can be used to communication out to a user in the service area while the microphone 1291 can be used to receive communications from the user in the service area.

The data interface 1260 can provide wired data connections, such as one or more universal serial bus (USB)

interfaces and/or one or more serial input/output interfaces (e.g., RS232). The data interface 1260 can also provide a parallel data interface. The plurality of radio transmitter/receivers (transceivers) 1262A-1262N can provide wireless data connections such as over WIFI, Bluetooth, and/or cellular. The one or more audio video devices can use the wireless data connections or the wired data connections to communicate with the computer 1201.

The computer 1201 can be an edge computer that provides for remote logins and remote virtual sessions through one or more of the plurality of network interfaces 1261A-1261N. Additionally, each of the network interfaces support one or more network connections. Network interfaces can be virtual interface and also be logically separated from other virtual interfaces.

In one embodiment, one or more of the network interface cards (NIC) 1261A-1261N can include firmware with instructions of a virtual private network functionality that includes a predetermined symmetric cypher algorithm and uses the symmetric quantum keys in the production key packages described herein to form quantum tunnels with other computer systems 1200 as instances of the user devices between users. In another embodiment, one or more of the network interface cards (NIC) 1261A-1261N can include firmware with instructions to perform the functional processes described herein of a production key server with a quantum random number generator generate quantum keys and random file names to generate the production key package and sacrificial key packages. One or more of the network interface cards (NIC) 1261A-1261N can include firmware with instructions to perform the functional processes described herein of an access key server, and/or a sacrificial key server.

One or more computing systems 1200 and/or one or more computers 1201 (or computer servers) can be used to perform some or all of the processes disclosed herein. The software instructions that performs the functionality of servers and devices are stored in the storage device 1230,1240 and loaded into memory 1220 when being executed by the processor 1210.

In one embodiment, the processor 1210 executes instructions residing on a machine-readable medium, such as the hard disk drive 1230,1240, a removable medium (e.g., a compact disk 1299, a magnetic tape, etc.), or a combination of both. The instructions can be loaded from the machine-readable medium into the memory 1220, which can include Random Access Memory (RAM), dynamic RAM (DRAM), etc. The processor 1210 can retrieve the instructions from the memory 1220 and execute the instructions to perform operations described herein.

The processor 1210 can have a predetermined cypher algorithm integrated into it as part of the instruction set to improve the speed and security of software applications performing encryption and decryption. For example, the processor can be one with an X86 instruction set architecture that includes integrates the AES cypher algorithm and has an Advanced Encryption Standard New Instructions AES-NI as part of its instruction set. ARM processors and SPARC processors have also integrated a predetermined cypher algorithm integrated into them as part of the instruction to implement similar functionality. In other cases, a dedicated cypher hardware accelerator device can be added to a motherboard, or included in the processor integrated circuit chip, and called up to perform cypher functionality by one or more processor instructions.

The processor can also have virtual private networking integrated into it with a predetermined cypher algorithm integrated to more easily set up and provide quantum tunnels with other computers and devices.

Note that any or all of the components and the associated hardware illustrated in FIG. 12 can be used in various embodiments of a computer system 1200. However, it should be appreciated that other configurations of the computer system 1200 can include more or less devices than those shown in FIG. 12.

Advantages

The systems, devices, apparatus, and software described herein have a number of advantages. User involvement in setting up secure data tunnels is reduced. Automates safe and secure symmetric key distribution from one location to another. Prevents unauthorized access of the transmission of encryption keys by removing human element of key management. Allows secure data tunnels between any types of devices and multiple devices to form a wide area cypher computer network Eases the setup of secure data tunnels between users.

No usernames and/or passwords are needed to distribute keys. In one embodiment, network addresses (e.g., IP addresses) can used to distribute production key packages with a plurality of quantum cipher keys as well as sacrificial send keys between servers and devices. The file names of the packages can be utilized to gain access to the first level of the package using the predetermined cipher algorithm. A printed code printed on paper can be used to distribute an initial key/production key package that with the use of software can provide access to a cypher network and additional production key packages. An electronic device, such as a solid state storage drive (e.g., thumb drive), can be used to distribute keys and/or production key packages.

Concluding Remarks

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments are thus described. While certain exemplary embodiments have been described and shown in the accompanying drawings, it is to be understood that such embodiments are merely illustrative of and not restrictive on the broad invention, and that the embodiments not be limited to the specific constructions and arrangements shown and described, since various other modifications may occur to those ordinarily skilled in the art.

When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" can include any medium that can store information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal can include any signal that can propagate over a transmission medium such as electronic network channels, optical fibers, air, electromagnetic, RF links, etc. The code segments can be downloaded using a computer data signal via computer networks such as the Internet, Intranet, etc. and stored in a storage device (processor readable medium).

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed embodiments are limited only by patented claims that follow below.

What is claimed is:

1. A method for quantum key distribution, the method comprising:
    forming a first quantum production key package with a first production file name, the first quantum production key package being an encrypted file with a plurality of quantum production keys;
    forming a first quantum sacrificial key package with a first sacrificial file name associated with a portion of the first production file name, the first quantum sacrificial key package being an encrypted file with a first sacrificial return key;
    sending the first quantum sacrificial key package to a sacrificial key server; and
    sending the first quantum production key package to a plurality of computer devices to set up a quantum key encryption tunnel between the plurality of computer devices.

2. The method for quantum key distribution of claim 1, further comprising:
    with a first computer device,
        receiving the first quantum production key package with the first production file name;
        sending the first production file name to the sacrificial key server;
        receiving the first sacrificial return key from the sacrificial key server;
        using the first sacrificial return key to decrypt the first quantum production key package with the plurality of quantum production keys;
        retrieving a first quantum production key out of the plurality of quantum production keys;
        using the first quantum production key to encrypt data to send to other computer devices of the plurality of computer devices; and
        using the first quantum production key to decrypt data received from the other computer devices of the plurality of computer devices.

3. The method for quantum key distribution of claim 2, further comprising:
    with a second computer device,
        receiving the first quantum production key package with the first production file name;
        sending the first production file name to the sacrificial key server;
        receiving the first sacrificial return key from the sacrificial key server;
        using the first sacrificial return key to decrypt the first quantum production key package with the plurality of quantum production keys;
        retrieving a first quantum production key out of the plurality of quantum production keys;
        using the first quantum production key to encrypt data to send to the first computer device of the plurality of computer devices; and
        using the first quantum production key to decrypt data received from the other first computer device of the plurality of computer devices.

4. The method for quantum key distribution of claim 2, further comprising:
    with the sacrificial key server,
    receiving the first quantum sacrificial key package with the first sacrificial return key;
    receiving the first production file name from one computer device of the plurality of computer devices;
    using a first sacrificial send key to decrypt the first sacrificial key package;
    retrieving the first sacrificial return key; and
    returning the first sacrificial return key to the one computer device of the plurality of computer devices.

5. The method for quantum key distribution of claim 4, wherein
    the first sacrificial send key is the first production file name.

6. The method for quantum key distribution of claim 1, wherein the first quantum production key package is formed by
    generating, into a first file having the first production file name, a first plurality of quantum encryption keys using a quantum random number generator; and
    encrypting the first file with a predetermined encryption algorithm using the first production file name to form the first quantum production key package.

7. The method for quantum key distribution of claim 1, wherein the first quantum sacrificial key package is formed by
    generating, into a file having a first sacrificial file name associated with a portion of the first production file name, a first sacrificial return key using a quantum random number generator;

encrypting the file with a predetermined encryption algorithm using the first sacrificial file name to form the first quantum sacrificial key package.

8. The method for quantum key distribution of claim 1, wherein the first quantum production key package further includes
an address of the sacrificial key server to which the first production file name can be sent.

9. A method for quantum key distribution, the method comprising:
- forming a first quantum production key package with a first production file name, the first quantum production key package being an encrypted file with a plurality of quantum production keys;
- forming a first quantum sacrificial key package with a first sacrificial file name associated with a portion of the first production file name, the first quantum sacrificial key package being an encrypted file with a first sacrificial return key;
- sending the first quantum sacrificial key package to a first single use sacrificial key server of a plurality of single use sacrificial key servers;
- sending an internet protocol (IP) address of the first single use sacrificial key server and the first quantum production key package to a first computer device of a plurality of computer devices to set up a quantum key encryption tunnel for the first computer device;
- sending the first quantum sacrificial key package to a second single use sacrificial key server of the plurality of single use sacrificial key servers; and
- sending an IP address of the second single use sacrificial key server and the first quantum production key package to a second computer device of the plurality of computer devices to set up a quantum key encryption tunnel for the second computer device.

10. The method for quantum key distribution of claim 9, further comprising:
- with a first computer device,
- receiving the first quantum production key package and the IP address of the first single use sacrificial key server;
- sending the first production file name to the first single use sacrificial key server associated with the IP address;
- receiving the first sacrificial return key from the first single use sacrificial key server;
- using the first sacrificial return key to decrypt the first quantum production key package with the plurality of quantum production keys;
- retrieving a first quantum production key out of the plurality of quantum production keys;
- using the first quantum production key to encrypt data to send to other computer devices of the plurality of computer devices; and
- using the first quantum production key to decrypt data received from the other computer devices of the plurality of computer devices.

11. The method for quantum key distribution of claim 10, further comprising:
- with a hacking computer device to gain access to information,
- stealing the first quantum production key package and the IP address of the first single use sacrificial key server;
- sending the first production file name to the first single use sacrificial key server associated with the IP address; and
- receiving no response or a null response from the first single use sacrificial key server given that the first quantum production key package and the IP address were previously used by the first computer device.

* * * * *